US011366284B2

(12) United States Patent
Nunnink et al.

(10) Patent No.: US 11,366,284 B2
(45) Date of Patent: Jun. 21, 2022

(54) VISION SYSTEM CAMERA WITH MOUNT FOR MULTIPLE LENS TYPES AND LENS MODULE FOR THE SAME

(71) Applicant: Cognex Corporation, Natick, MA (US)

(72) Inventors: Laurens Nunnink, Simpleveld (NL); Rene Delasauce, Aachen (DE); Nicole Dippel, Aachen (DE); Andreas Weber, Aachen (DE)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/371,987

(22) Filed: Apr. 1, 2019

(65) Prior Publication Data

US 2019/0361194 A1 Nov. 28, 2019

Related U.S. Application Data

(63) Continuation-in-part of application No. 16/119,909, filed on Aug. 31, 2018, now Pat. No. 10,678,019,
(Continued)

(51) Int. Cl.
*H04N 5/225* (2006.01)
*G03B 17/02* (2021.01)
(Continued)

(52) U.S. Cl.
CPC ............... *G02B 7/14* (2013.01); *G02B 3/14* (2013.01); *G02B 7/022* (2013.01); *G02B 26/005* (2013.01);
(Continued)

(58) Field of Classification Search
CPC . G02B 7/14; G02B 3/14; G02B 7/022; G02B 26/005; G02B 7/08; G03B 17/14;
(Continued)

(56) References Cited

U.S. PATENT DOCUMENTS 1,873,149 A 8/1932 Fernando
2,409,328 A 10/1946 Wilder
(Continued)

FOREIGN PATENT DOCUMENTS

CN 1155675 A 7/1997
CN 1230815 A 10/1999
(Continued)

OTHER PUBLICATIONS

Cognex Corporation, "Cognex Expands Reading Capability", Nov. 5, 2010, Publisher: Cognex corporation, Published in: US.
(Continued)

*Primary Examiner* — Abdelaaziz Tissire
(74) *Attorney, Agent, or Firm* — Loginov & Associates, PLLC; William A. Loginov

(57) ABSTRACT

This invention provides a vision system having a housing and an interchangeable lens module is provided. The module is adapted to seat on a C-mount ring provided on the front, mounting face of the housing. The module is attached via a plurality of fasteners that pass through a frame of the module and into the mounting face. The module includes a connector in a fixed location, which mates with a connector well on the mounting face to provide power and control to a driver board that operates a variable (e.g. liquid) lens within the optics of the lens module. The driver board is connected to the lens body by a flexible printed circuit board (PCB), which also allows for axial motion of the lens body with respect to the frame. This axial motion can be effected by an adjustment ring that can include an indexed/lockable, geared, outer surface.

22 Claims, 13 Drawing Sheets

Related U.S. Application Data which is a continuation of application No. 14/611,401, filed on Feb. 2, 2015, now Pat. No. 10,067,312, which is a continuation of application No. 13/302,751, filed on Nov. 22, 2011, now Pat. No. 8,947,590.

(51) Int. Cl.
  *G02B 7/14* (2021.01)
  *G02B 26/00* (2006.01)
  *G02B 7/02* (2021.01)
  *G03B 17/14* (2021.01)
  *G02B 3/14* (2006.01)

(52) U.S. Cl.
  CPC .............. *G03B 17/02* (2013.01); *G03B 17/14* (2013.01); *H04N 5/2251* (2013.01); *H04N 5/2252* (2013.01); *H04N 5/2253* (2013.01)

(58) Field of Classification Search
  CPC .... G03B 17/02; H04N 5/2253; H04N 5/2251; H04N 5/2252; H04N 5/2254
  See application file for complete search history.

(56) References Cited

U.S. PATENT DOCUMENTS

| | | | |
|---|---|---|---|
| 3,682,069 A * | 8/1972 | Lecoeur | G03B 17/14 396/533 |
| 3,709,132 A | 1/1973 | Farrell | |
| 3,940,777 A | 2/1976 | Komine | |
| 4,072,396 A | 2/1978 | Ross | |
| 4,160,590 A | 7/1979 | Reynard | |
| 4,230,403 A | 10/1980 | Hashimoto | |
| 4,314,752 A | 2/1982 | Ishizaka | |
| 4,451,131 A | 5/1984 | Shimizu | |
| 4,478,491 A | 10/1984 | Kawai | |
| 4,490,018 A | 12/1984 | Yokotsuka | |
| 4,494,828 A | 1/1985 | Masumoto | |
| 4,591,253 A | 5/1986 | Hecker | |
| 4,781,448 A | 11/1988 | Chatenever | |
| 4,864,341 A | 9/1989 | Maekawa | |
| 4,871,238 A | 10/1989 | Sato | |
| 4,877,949 A | 10/1989 | Danielson | |
| 4,894,677 A | 1/1990 | Bourcier | |
| 4,974,138 A | 11/1990 | Negishi | |
| 5,010,412 A | 4/1991 | Garriss | |
| 5,019,699 A | 5/1991 | Koenck | |
| 5,136,320 A | 8/1992 | Kobayashi | |
| 5,155,343 A | 10/1992 | Chandler | |
| 5,245,172 A | 9/1993 | Esslinger | |
| 5,245,671 A | 9/1993 | Kobayashi | |
| 5,247,162 A | 9/1993 | Swartz | |
| 5,291,232 A | 3/1994 | Kobayashi | |
| 5,308,966 A | 5/1994 | Danielson | |
| 5,313,053 A | 5/1994 | Koenck | |
| 5,331,176 A | 7/1994 | Sant Anselmo | |
| 5,331,178 A | 7/1994 | Fukuda | |
| 5,349,172 A | 9/1994 | Roustaei | |
| 5,363,164 A | 11/1994 | Kobayashi | |
| 5,365,597 A | 11/1994 | Holeva | |
| 5,378,883 A | 1/1995 | Batterman | |
| 5,399,846 A | 3/1995 | Pavlidis | |
| 5,471,043 A | 11/1995 | Knapp | |
| 5,473,150 A | 12/1995 | Huhn | |
| 5,478,997 A | 12/1995 | Bridgelall | |
| 5,500,516 A | 3/1996 | Durbin | |
| 5,513,264 A | 4/1996 | Wang | |
| 5,569,902 A | 10/1996 | Wood | |
| 5,572,006 A | 11/1996 | Wang | |
| 5,580,163 A | 12/1996 | Johnson, II | |
| 5,587,843 A | 12/1996 | Chen | |
| 5,596,368 A | 1/1997 | Capper | |
| 5,598,007 A | 1/1997 | Bunce | |
| 5,608,202 A | 3/1997 | Bridgelall | |
| 5,627,360 A | 5/1997 | Rudeen | |
| 5,640,001 A | 6/1997 | Danielson | |
| 5,644,441 A | 7/1997 | Hirasaki | |
| 5,659,167 A | 8/1997 | Wang | |
| 5,672,858 A | 9/1997 | Li | |
| 5,715,095 A | 2/1998 | Hiratsuka | |
| 5,734,153 A | 3/1998 | Swartz | |
| 5,756,981 A | 5/1998 | Roustaei | |
| 5,773,810 A | 6/1998 | Hussey | |
| 5,783,811 A | 7/1998 | Feng | |
| 5,786,582 A | 7/1998 | Roustaei | |
| 5,786,586 A | 7/1998 | Pidhirny | |
| 5,793,033 A | 8/1998 | Feng | |
| 5,811,828 A | 9/1998 | Laser | |
| 5,818,528 A | 10/1998 | Roth | |
| 5,821,518 A | 10/1998 | Sussmeier | |
| 5,825,006 A | 10/1998 | Longacre | |
| 5,825,559 A | 10/1998 | Johnson | |
| 5,834,754 A | 11/1998 | Feng | |
| 5,844,229 A | 12/1998 | Rockstein | |
| 5,864,128 A | 1/1999 | Plesko | |
| 5,886,338 A | 3/1999 | Arackellian | |
| 5,897,195 A | 4/1999 | Choate | |
| 5,898,522 A * | 4/1999 | Herpst | G02B 7/007 359/511 |
| 5,943,169 A | 8/1999 | Okada | |
| 5,945,658 A | 8/1999 | Salatto, Jr. | |
| 5,949,057 A | 9/1999 | Feng | |
| 5,969,321 A | 10/1999 | Danielson | |
| 5,992,751 A | 11/1999 | Laser | |
| 6,022,124 A | 2/2000 | Bourn | |
| 6,060,722 A | 5/2000 | Havens | |
| 6,066,857 A | 5/2000 | Fantone | |
| 6,073,851 A | 6/2000 | Olmstead | |
| 6,098,887 A | 8/2000 | Figarella | |
| 6,164,544 A | 12/2000 | Schwartz | |
| 6,172,709 B1 | 1/2001 | Yamano | |
| 6,179,208 B1 | 1/2001 | Feng | |
| 6,223,986 B1 | 5/2001 | Bobba | |
| 6,223,988 B1 | 5/2001 | Batterman | |
| 6,238,060 B1 | 5/2001 | Bourn | |
| 6,266,196 B1 | 7/2001 | Do | |
| 6,273,338 B1 | 8/2001 | White | |
| 6,298,176 B2 | 10/2001 | Longacre | |
| 6,318,924 B1 | 11/2001 | Schiavo, Jr. | |
| 6,339,680 B1 | 1/2002 | Mauvais | |
| 6,340,114 B1 | 1/2002 | Correa | |
| 6,347,163 B2 | 2/2002 | Roustaei | |
| 6,385,507 B1 | 5/2002 | Buijtels | |
| 6,431,452 B2 | 8/2002 | Feng | |
| 6,445,450 B1 | 9/2002 | Matsumoto | |
| 6,449,430 B1 | 9/2002 | Tasaka | |
| 6,474,556 B2 | 11/2002 | Dickson | |
| 6,527,183 B2 | 3/2003 | Bard | |
| 6,542,238 B1 | 4/2003 | Tsuboi | |
| 6,556,355 B2 | 4/2003 | Tsutsumi | |
| 6,607,132 B1 | 8/2003 | Dvorkis | |
| 6,636,298 B1 | 10/2003 | Bachelder | |
| 6,651,886 B2 | 11/2003 | Gurevich | |
| 6,651,888 B1 | 11/2003 | Gurevich | |
| 6,659,350 B2 | 12/2003 | Schwartz | |
| 6,663,260 B1 | 12/2003 | Tieszen | |
| 6,669,093 B1 | 12/2003 | Meyerson | |
| 6,681,994 B1 | 1/2004 | Koenck | |
| 6,689,998 B1 | 2/2004 | Bremer | |
| 6,712,270 B2 | 3/2004 | Leach | |
| 6,729,546 B2 | 5/2004 | Roustaei | |
| 6,765,393 B2 | 7/2004 | Pierenkemper | |
| 6,781,630 B2 | 8/2004 | Nomura | |
| 6,805,295 B2 | 10/2004 | Barkan | |
| 6,808,114 B1 | 10/2004 | Palestini | |
| 6,809,847 B2 | 10/2004 | McQueen | |
| 6,827,270 B2 | 12/2004 | Yomogida | |
| 6,832,725 B2 | 12/2004 | Gardiner | |
| 6,832,729 B1 | 12/2004 | Perry | |
| 6,837,433 B2 | 1/2005 | Jam | |
| 6,845,915 B2 | 1/2005 | Krichever | |
| 6,866,198 B2 | 3/2005 | Patel | |
| 6,877,664 B1 | 4/2005 | Oliva | |

(56) References Cited

U.S. PATENT DOCUMENTS

| | | | |
|---|---|---|---|
| 6,891,679 B2 * | 5/2005 | Atarashi | G02B 3/14 359/665 |
| 6,918,538 B2 | 7/2005 | Breytman | |
| 6,967,794 B2 | 11/2005 | Luthardt | |
| 6,974,085 B1 | 12/2005 | Koenck | |
| 6,997,385 B2 | 2/2006 | Palestini | |
| 7,007,843 B2 | 3/2006 | Poloniewicz | |
| 7,025,271 B2 | 4/2006 | Dvorkis | |
| 7,025,272 B2 | 4/2006 | Yavid | |
| 7,025,273 B2 | 4/2006 | Breytman | |
| 7,042,490 B2 | 5/2006 | Numazaki | |
| 7,055,747 B2 | 6/2006 | Havens | |
| 7,063,256 B2 | 6/2006 | Anderson | |
| 7,073,711 B2 | 7/2006 | Fernandez | |
| 7,073,715 B2 | 7/2006 | Patel | |
| 7,075,663 B2 | 7/2006 | Canini | |
| 7,077,325 B2 | 7/2006 | Tan | |
| 7,090,137 B1 | 8/2006 | Bennett | |
| 7,097,105 B2 | 8/2006 | Wilz, Sr. | |
| 7,128,266 B2 | 10/2006 | Zhu | |
| 7,136,582 B2 | 11/2006 | Hayami | |
| 7,147,159 B2 | 12/2006 | Longacre, Jr. | |
| 7,201,318 B2 | 4/2007 | Craen | |
| 7,222,793 B2 | 5/2007 | Patel | |
| 7,224,540 B2 | 5/2007 | Olmstead | |
| 7,264,162 B2 | 9/2007 | Barkan | |
| 7,292,281 B2 | 11/2007 | Cheng | |
| 7,296,749 B2 | 11/2007 | Massieu | |
| 7,311,260 B2 | 12/2007 | Zosel | |
| 7,315,241 B1 | 1/2008 | Daily | |
| 7,344,273 B2 | 3/2008 | Lewis | |
| 7,387,246 B2 | 6/2008 | Palestini | |
| 7,392,951 B2 | 7/2008 | Ray | |
| 7,395,970 B2 | 7/2008 | Poloniewicz | |
| 7,454,841 B2 | 11/2008 | Burns, Jr. | |
| 7,549,582 B1 * | 6/2009 | Nunnink | G02B 27/40 235/435 |
| 7,646,423 B2 | 1/2010 | Yoshida | |
| 7,686,223 B2 | 3/2010 | Vinogradov | |
| 7,813,047 B2 | 10/2010 | Wang | |
| 7,850,377 B2 | 12/2010 | Okamoto | |
| 7,853,137 B2 | 12/2010 | Yang | |
| 7,899,311 B1 * | 3/2011 | Kearney | G03B 37/04 396/12 |
| 7,900,839 B2 | 3/2011 | Kotlarsky | |
| 7,942,329 B2 | 5/2011 | Pine | |
| 7,957,007 B2 | 6/2011 | Raskar | |
| 7,967,205 B2 | 6/2011 | Pankow | |
| 7,994,452 B2 | 8/2011 | Sawabe | |
| 8,134,116 B2 | 3/2012 | Nunnink | |
| 8,181,878 B2 * | 5/2012 | Nunnink | G06K 7/10811 235/462.2 |
| 8,731,389 B2 * | 5/2014 | Gainer | G03B 3/10 396/133 |
| 8,947,590 B2 * | 2/2015 | Nunnink | G02B 26/005 348/374 |
| 9,823,552 B2 | 11/2017 | Kungl | |
| 2001/0012413 A1 | 8/2001 | Longacre | |
| 2001/0017731 A1 | 8/2001 | Smith | |
| 2002/0014532 A1 | 2/2002 | Yomogida | |
| 2002/0034320 A1 | 3/2002 | Mann | |
| 2002/0039099 A1 | 4/2002 | Harper | |
| 2002/0057440 A1 | 5/2002 | Weiner | |
| 2002/0074403 A1 | 6/2002 | Krichever | |
| 2002/0130963 A1 | 9/2002 | Gelbard | |
| 2002/0171745 A1 | 11/2002 | Ehrhart | |
| 2002/0191309 A1 | 12/2002 | Taylor | |
| 2003/0019934 A1 | 1/2003 | Hunter | |
| 2003/0020491 A1 | 1/2003 | Pierenkemper | |
| 2003/0062413 A1 | 4/2003 | Gardiner | |
| 2003/0085283 A1 | 5/2003 | Barkan | |
| 2003/0132291 A1 | 7/2003 | Schmidt | |
| 2003/0201327 A1 | 10/2003 | Jam | |
| 2003/0205620 A1 | 11/2003 | Byun | |
| 2003/0226895 A1 | 12/2003 | Havens | |
| 2004/0020990 A1 | 2/2004 | Havens | |
| 2004/0060032 A1 | 3/2004 | McCubbrey | |
| 2004/0092138 A1 | 5/2004 | Smith | |
| 2004/0159703 A1 | 8/2004 | Kogan | |
| 2004/0223074 A1 * | 11/2004 | Takada | H04N 5/2253 348/360 |
| 2004/0238637 A1 | 12/2004 | Russell | |
| 2005/0035204 A1 | 2/2005 | Knappert | |
| 2005/0045725 A1 | 3/2005 | Gurevich | |
| 2005/0058442 A1 * | 3/2005 | Takeda | H04N 5/23287 396/55 |
| 2005/0103851 A1 | 5/2005 | Zhu | |
| 2005/0103854 A1 | 5/2005 | Zhu | |
| 2005/0103857 A1 | 5/2005 | Zhu | |
| 2005/0103858 A1 | 5/2005 | Zhu | |
| 2005/0133601 A1 | 6/2005 | Yomogida | |
| 2005/0167504 A1 | 8/2005 | Meier | |
| 2005/0180037 A1 | 8/2005 | Masterson | |
| 2005/0199725 A1 | 9/2005 | Craen | |
| 2005/0212951 A1 | 9/2005 | Miyata | |
| 2006/0008267 A1 | 1/2006 | Kim | |
| 2006/0027659 A1 | 2/2006 | Patel | |
| 2006/0034596 A1 * | 2/2006 | Yamazaki | G02B 7/10 396/79 |
| 2006/0043187 A1 | 3/2006 | He | |
| 2006/0043191 A1 | 3/2006 | Patel | |
| 2006/0055819 A1 | 3/2006 | Pokrovsky | |
| 2006/0060653 A1 | 3/2006 | Wittenberg | |
| 2006/0081712 A1 | 4/2006 | Rudeen | |
| 2006/0103755 A1 | 5/2006 | Costigan | |
| 2006/0164538 A1 | 7/2006 | Kawasaki | |
| 2006/0213994 A1 | 9/2006 | Faiz | |
| 2006/0251408 A1 | 11/2006 | Konno | |
| 2006/0279713 A1 | 12/2006 | Wang | |
| 2007/0040034 A1 | 2/2007 | Hennick | |
| 2007/0057067 A1 | 3/2007 | He | |
| 2007/0131770 A1 | 6/2007 | Laurens | |
| 2007/0153512 A1 | 7/2007 | Hendrie | |
| 2007/0164115 A1 | 7/2007 | Joseph | |
| 2007/0170259 A1 | 7/2007 | Laurens | |
| 2007/0241195 A1 | 10/2007 | Hussey | |
| 2007/0247422 A1 | 10/2007 | Vertegaal | |
| 2008/0093530 A1 | 4/2008 | Hoelen | |
| 2008/0121168 A1 | 5/2008 | Ryznar | |
| 2008/0144185 A1 * | 6/2008 | Wang | H04N 5/23212 359/665 |
| 2008/0158678 A1 * | 7/2008 | Costigan | G02B 7/04 359/512 |
| 2008/0277480 A1 | 11/2008 | Thuries | |
| 2009/0027784 A1 * | 1/2009 | Tsai | G02B 7/08 359/824 |
| 2009/0057413 A1 | 3/2009 | Vinogradov | |
| 2009/0135287 A1 | 5/2009 | Yang | |
| 2009/0159684 A1 | 6/2009 | Barber | |
| 2009/0166424 A1 | 7/2009 | Gerst | |
| 2009/0200380 A1 | 8/2009 | Longacre, Jr. | |
| 2010/0013922 A1 | 1/2010 | Cheng | |
| 2010/0165188 A1 | 7/2010 | Jannard | |
| 2010/0176319 A1 * | 7/2010 | Nunnink | G06K 7/10811 250/566 |
| 2010/0177319 A1 | 7/2010 | Towers | |
| 2011/0019106 A1 | 1/2011 | Kimura | |
| 2011/0019162 A1 | 1/2011 | Huebner | |
| 2011/0019914 A1 | 1/2011 | Bimber | |
| 2011/0058804 A1 * | 3/2011 | Ito | H04N 5/2254 396/439 |
| 2011/0063742 A1 * | 3/2011 | Mori | G02B 7/102 359/823 |
| 2011/0234803 A1 * | 9/2011 | Nakajima | H04N 5/2254 348/148 |
| 2011/0249966 A1 * | 10/2011 | Weber | G03B 17/12 396/530 |
| 2012/0133825 A1 * | 5/2012 | Nakajima | G02B 7/025 348/374 |
| 2013/0128104 A1 * | 5/2013 | Nunnink | H04N 5/2252 348/373 |

(56) References Cited

U.S. PATENT DOCUMENTS

| | | | |
|---|---|---|---|
| 2013/0128105 A1* | 5/2013 | Nunnink | G02B 7/14 348/374 |
| 2013/0200157 A1* | 8/2013 | Nunnink | G02B 27/14 235/462.22 |
| 2013/0201563 A1* | 8/2013 | Nunnink | G02B 27/1066 359/618 |
| 2013/0301058 A1* | 11/2013 | Nunnink | G01B 11/00 356/606 |
| 2014/0098220 A1* | 4/2014 | Nunnink | H04N 5/225 348/135 |
| 2014/0111682 A1* | 4/2014 | Flugge | H04N 5/2254 348/345 |
| 2014/0152885 A1* | 6/2014 | Nunnink | G02B 1/06 348/345 |
| 2014/0268361 A1* | 9/2014 | Nunnink | G02B 3/14 359/665 |
| 2015/0338557 A1* | 11/2015 | Nunnink | G02B 3/14 359/666 |
| 2016/0188936 A1* | 6/2016 | Nunnink | G02B 17/06 235/462.22 |
| 2016/0349601 A1* | 12/2016 | Kungl | G03B 17/02 |
| 2017/0090076 A1* | 3/2017 | Nunnink | G02B 3/14 |
| 2017/0357035 A1* | 12/2017 | Nunnink | G02B 7/08 |
| 2019/0054918 A1 | 2/2019 | Lu | |
| 2019/0148429 A1 | 5/2019 | Wang | |
| 2019/0265433 A1 | 8/2019 | Nunnink | |
| 2019/0361194 A1* | 11/2019 | Nunnink | G03B 17/02 |
| 2020/0124818 A1 | 4/2020 | Hubert | |

FOREIGN PATENT DOCUMENTS

| | | |
|---|---|---|
| CN | 1704792 A | 12/2005 |
| CN | 101027794 A | 8/2007 |
| EP | 0574024 | 12/1993 |
| EP | 0745951 | 12/1996 |
| EP | 0755018 | 1/1997 |
| EP | 0840107 | 5/1998 |
| EP | 0957448 | 11/1999 |
| EP | 1308875 | 5/2003 |
| EP | 1519298 A2 | 3/2005 |
| EP | 1560150 B1 | 8/2005 |
| GB | 2444399 A | 6/2008 |
| JP | H09128471 | 5/1997 |
| JP | H10134133 | 5/1998 |
| TW | M350188 | 2/2009 |
| WO | 9603708 A1 | 2/1996 |
| WO | 9816896 A1 | 4/1998 |
| WO | 0016241 A1 | 3/2000 |
| WO | 02073953 | 9/2002 |
| WO | 03062956 A2 | 7/2003 |
| WO | 03063064 A1 | 7/2003 |
| WO | 2005041111 A2 | 5/2005 |
| WO | 2005050390 A2 | 6/2005 |
| WO | 2005073895 A1 | 8/2005 |
| WO | 2006004858 A2 | 1/2006 |
| WO | 2006026239 A2 | 3/2006 |
| WO | 2008076399 | 6/2008 |
| WO | 2010036403 A2 | 4/2010 |

OTHER PUBLICATIONS

Cognex Corporation, "Dataman 100 SHD/C-Mount Kit Removal Instructions", 2007, Publisher: Cognext Corporation, Published in: US.

Gainer, "U.S. Appl. No. 13/302,922, Auto-Focus Mechanism for Vision System Camera", filed Nov. 22, 2011.

Nunnink, , "Vision System and Camera with Mount for Multiple Lens Types", U.S. Appl. No. 13/302,751, filed Nov. 22, 2011.

Nunnink, "U.S. Appl. No. 13/302,858, Camera System With Exchangeable Illumiantion Assembly", filed Nov. 22, 2011.

Panasonic, "Lumix G Micro System", Oct. 2008, Published in: Germany (With English Language Translation of p. 1).

Wikipedia, "Interchangeable Lens", Oct. 12, 2011, Published in: Germany (With English Language Translation of 1st Paragraph).

* cited by examiner

VISION SYSTEM CAMERA WITH MOUNT FOR MULTIPLE LENS TYPES AND LENS MODULE FOR THE SAME

RELATED APPLICATIONS

This application is a continuation-in-part of U.S. patent application Ser. No. 16/119,909, entitled VISION SYSTEM CAMERA WITH MOUNT FOR MULTIPLE LENS TYPES, filed Aug. 31, 2018, which is a continuation of U.S. patent application Ser. No. 14/611,401, filed Feb. 2, 2015, entitled VISION SYSTEM CAMERA WITH MOUNT FOR MULTIPLE LENS TYPES, now U.S. Pat. No. 10,067,312, issued Sep. 4, 2018, which is a continuation of U.S. patent application Ser. No. 13/302,751, filed Nov. 22, 2011, now U.S. Pat. No. 8,947,590, issued Feb. 3, 2015, entitled VISION SYSTEM CAMERA WITH MOUNT FOR MULTIPLE LENS TYPES, the entire disclosures of each of which applications are expressly incorporated herein by reference.

FIELD OF THE INVENTION

This invention relates to vision system cameras and more particularly to lens mounts for vision system cameras.

BACKGROUND OF THE INVENTION

Vision systems that perform measurement, inspection, alignment of objects and/or decoding of symbology (e.g. bar codes) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a symbology (barcode) reader, the user or automated process acquires an image of an object that is believed to contain one or more barcodes. The image is processed to identify barcode features, which are then decoded by a decoding process and/or processor obtain the inherent alphanumeric data represented by the code.

It is increasingly desirable to provide vision systems and associated vision system components that can be used for a variety of purposes. By way of example, an integrated sensor and single instruction, multiple data (SIMD) processor, which can be termed a vision system on a chip (VSoC), is shown and described in U.S. patent application Ser. No. 12/184,187, entitled VISION SENSORS, SYSTEMS AND METHODS, by E. John McGarry, et al., the teachings of which are incorporated by reference as useful background information. This architecture provided a highly versatile and widely applicable vision system platform for a variety of vision system tasks. The ability to provide a versatile system reduces costs by eliminating the need to provide a number of purpose-built vision system arrangements for specific applications. It is therefore desirable to provide such versatile vision system platforms. Other currently available arrangements of sensors and processors (e.g. digital signal processors (DSPs) can also be employed to provide a relatively compact and robust vision system.

While programs can be readily adapted for a particular vision system task, it is more of a challenge to adapt the system's physical package to that task. For example, some vision tasks call for a larger lens, such as a cine or C-mount unit, while others can be accomplished best with a smaller M12 thread (12 mm×0.5 mm thread) lens, also termed an "S-mount", or more basically, an "M12" lens. Alternatively, an M16 mount (16 mm×0.5 mm thread) can be used instead of an M12. Others are best suited to a liquid lens, or a similar arrangement. By way of further background, a liquid lens uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. Relative to other autofocus mechanisms, the liquid lens has extremely fast response times. It is also ideal for applications with reading distances that change from object-to-object (surface-to-surface) or during the changeover from the reading of one object to another object.

The choice of lens type (e.g. C-mount, M12, M16, liquid lens, etc.) can be driven by such factors as lighting/illumination, field of view, focal distance, relative angle of the camera axis and imaged surface, and the fineness of details on the imaged surface. In addition, the cost of the lens and/or the available space for mounting the vision system can drive the choice of lens.

It is further recognized that standard lens mounts, such as the C-mount require precise placement and spacing of optical components. This can make the provision of lenses in an interchangeable form challenging. Additionally, lens types that incorporate electrically operates components, such as variable-optics (e.g. mechanical focus or liquid lenses) require connections between the camera body and lens body. This connection should be taken into account in any interchangeable design.

SUMMARY OF THE INVENTION

This invention overcomes the disadvantages of the prior art by providing a vision system housing having a front plate assembly that accommodates a plurality of lens mount types, thereby avoiding the need of costly changes to the vision system's physical housing or package. This vision system can, thus, employ multiple lens types with no reduction in quality of the acquired image when compared with using a system that provides a discrete, purpose-built lens mount. The front plate includes a central aperture that is located at a predetermined axial (camera axis) distance from a plane of an image sensor. The aperture is stepped from a wider diameter adjacent to the front to a narrower diameter more adjacent to the sensor. This arrangement of diameter and relative depth within the front plate enables threaded mounting of a plurality of lens mount types, illustratively an M12 or M16 lens mount and C-Mount. The threaded base for the M12 of M16 lens mount is provided in the smaller-diameter interior portion of the front plate aperture, adjacent to the sensor. Additionally, the threaded base for the C-Mount lens is provided at the front of the front plate, adjacent to the exterior surface of the front plate and housing. The exterior (front) surface of the front plate includes threaded holes and a spring clip arrangement (fastened by screws) constructed and arranged to accommodate a liquid lens positioned over the aperture with an associated lens assembly mounted within the aperture and in optical communication with the liquid lens. The lens is operated using an electrical connection provided by a cable that interconnects with a multi-pin socket positioned on the front plate aside the aperture. The socket interconnects with processor circuitry within the housing that enables control of the liquid lens.

In an illustrative embodiment the vision system defines a housing that includes a front plate assembly comprising an aperture aligned relative to an image sensor located within an interior of the housing, the aperture including an outer step having a first diameter and in inner step have a second diameter smaller than the first diameter. The first step is constructed and arranged to receive a first lens type base and the second step is constructed and arranged to receive a second lens type base. By way of example, the outer step is constructed and arranged to receive a C-mount lens base and the inner step is constructed and arranged to receive an M12 or M16 lens base. Moreover, the front plate assembly is constructed and arranged to receive, over the aperture, a liquid lens module. A clip assembly, illustratively comprising a spring assembly with retaining shoulders that is secured by screws to threaded holes around the aperture, engages portions of the housing or shell of the liquid lens module. The front plate assembly also illustratively includes a first socket, interconnected with control circuitry within the housing, which receives a cable to operate the liquid lens module. A second socket can also interconnect the control circuitry with an illuminator. The front plate assembly is illustratively attached to a body section of the housing using bolts having ends that are exposed at the outer face of the front plate assembly and pass into the body section. These ends can include threaded holes that receive fasteners that allow attachment of the front plate assembly to a mount or accessory.

More generally, in an illustrative embodiment, the vision system housing includes a main body section having an image sensor within the interior thereof. A front plate assembly is attached to the main body section. The front plate assembly includes threaded structures for selectively, removably and directly attaching at least three discrete types of lens thereto. By way of example, the three lens types can include a C-mount lens, and M12 or M16 lens and a liquid lens module.

In an exemplary implementation, a vision system having a housing and an interchangeable lens module is provided. The module is adapted to seat on a C-mount ring provided on the front, mounting face of the housing. The module is attached via a plurality of fasteners that pass through a frame of the module and into the mounting face. The module includes a connector in a fixed location, which mates with a connector well on the mounting face to provide power and control to a driver board that operates a variable (e.g. liquid) lens within the optics of the lens module. The driver board is connected to the lens body by a flexible printed circuit board (PCB), which also allows for axial motion of the lens body with respect to the frame. This axial motion can be effected by an adjustment ring that can include a geared outer surface. The gear is exposed for a user to manipulate and/or for integration with a geared drive motor. The internal design of the gear mechanism (e.g. Acme-type square threads, etc.) converts the angular movement of the gear into an axial movement of the lens that is substantially free of backlash.

In an illustrative embodiment a vision system and lens module for a vision system are provided. The vision system includes a housing with a front mounting face with an aperture aligned relative to an image sensor located within an interior of the housing. The aperture can have an outer step having a first diameter, and the outer step can be constructed and arranged to receive a first lens type base, wherein the outer step defines female threads for mounting the first lens type and a mounting flange on the mounting face for the first lens type base. The lens module has a frame assembly and a lens barrel. The frame assembly is arranged to engage the flange, and has fasteners aligned with fastener receiving members on the front face located at, or adjacent to, the flange. The lens barrel is mounted relative to the sensor in an aligned and spaced-apart relationship, free of mating threads between the lens barrel and the housing. Illustratively, an inner step is provided to the housing lens mount, having a second diameter smaller than the first diameter. The inner step is arranged to receive a second lens type, in which the inner step defines female threads for mounting the second lens type base. The rear portion of the lens barrel can be sized and arranged to reside adjacent to the inner step, and/or the outer step can be constructed and arranged to receive a C-mount lens base and the inner step is constructed and arranged to receive an M12 or M16 lens base. In exemplary arrangements, the fasteners can comprise at least two screws passing through receiving holes in the frame and the fastener receiving members can comprise threaded holes, respectively sized and arranged to receive the screws. The lens barrel can have a variable lens assembly and the frame includes a fixed connector constructed and arranged to mate with a connector on the mounting face top provide an electrical connection between the housing and the variable lens assembly. Illustratively, the fixed connector projects from the frame and the connector on the mounting face resides in a well that is sized and arranged to allow insertion of the fixed connector when the module is mounted on the flange with a portion of the lens barrel located in the housing. The variable lens assembly can be a liquid lens assembly located adjacent at least one of a front, a center and rear of an arrangement of a plurality of fixed lenses. The frame assembly can support (e.g. in an overmolded polymer part attached to a metal bracket of the frame assembly) a driver circuit board electrically connected to the fixed connector, and an electrical connection can be located between the circuit board and the liquid lens assembly. Illustratively, the connection interconnects a temperature sensor located at or adjacent to the lens barrel, and/or the electrical connection comprises a flexible PCB. The lens module can be one of a plurality of lens modules each adapted for attachment to the flange with the fastening members, each of the plurality of lens modules having a respective lens barrel with discrete optical parameters. In exemplary implementations, an adjustment ring assembly is located between the frame assembly and the lens barrel, and is constructed and arranged to vary an axial position of the lens barrel with respect to the housing by (angular) rotation thereof (about a lens optical axis). The adjustment ring assembly can define a gear surface (optionally) located on an exterior of the lens module. The gear surface can be adapted to be at least one of (a) engaged by a user's fingers and (b) driven by a geared motor. Illustratively, the lens barrel defines a focal distance between approximately 10 millimeters and 35 millimeters. The frame assembly can define a U-shaped bracket for carrying the lens barrel, the flange defines a lens C-mount and the fasteners define at least two screws. The bracket can have an open side at which is attached a polymer part overmolded onto the bracket that encloses driver electronics relative to control of function of the lens module.

In an exemplary embodiment, a lens module for removable attachment to a vision system housing is provided. A lens driver electronics is mounted with respect to the module, in addition to a lens barrel having a liquid lens. An adjustment ring assembly axially moves the lens barrel, in a manner substantially free of rotation of the lens barrel relative to the module, based upon rotation of an adjustment ring mechanism relative to the module. A flexible connection is provided between the liquid lens and the lens driver electronics. Illustratively, the flexible connection comprises a cable or a flexible PCB. The lens driver electronics can be located adjacent to a frame assembly of the module in an attached enclosure, the frame assembly engages a mounting face of a vision system housing having an image sensor. A connector can be fixedly attached to the lens driver electronics so as to removably engage a connector on the mounting face.

BRIEF DESCRIPTION OF THE DRAWINGS

The invention description below refers to the accompanying drawings, of which.

DETAILED DESCRIPTION

I. Housing for Interchangeable Lens Types

Figure 1:
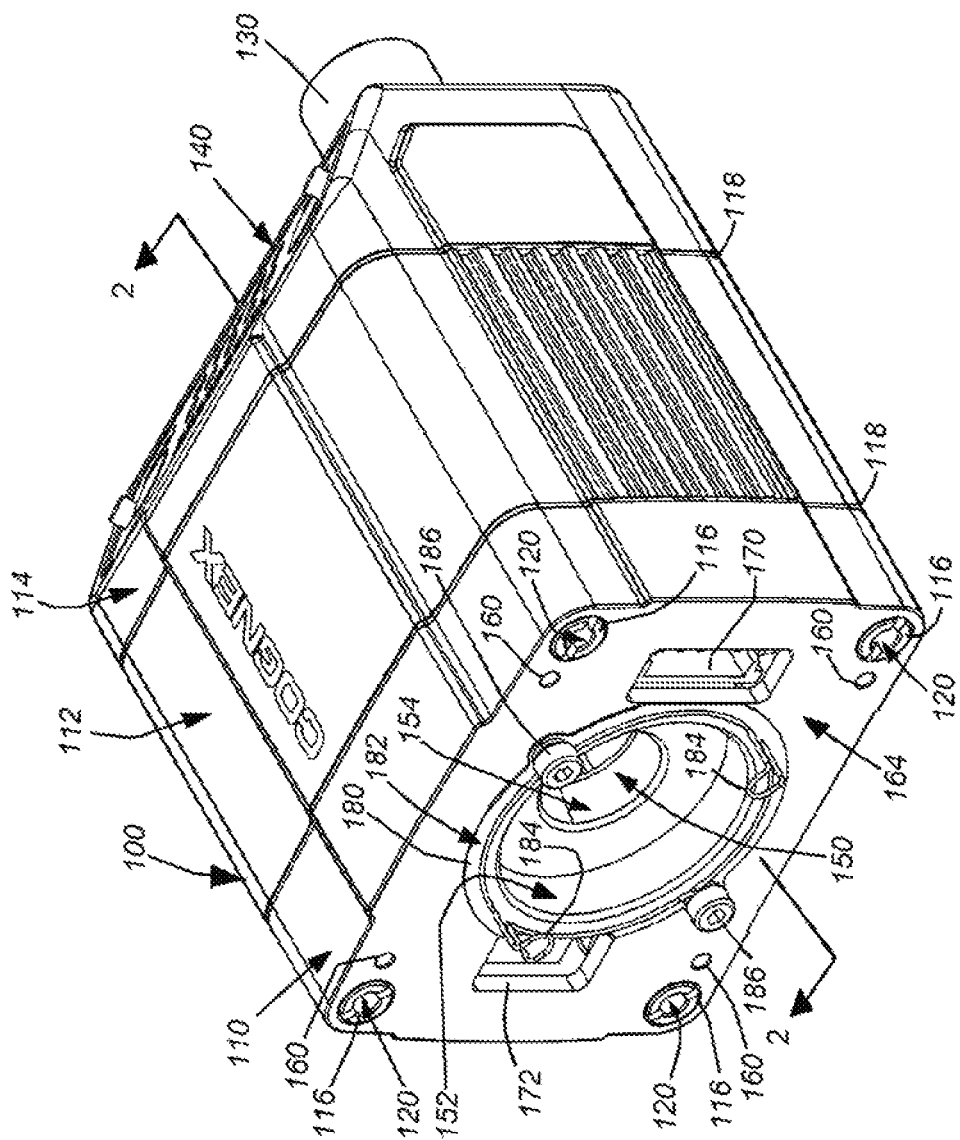
FIG. 1 is a perspective view of a vision system including a housing that allows for the removable attachment of a plurality of different lens mount types, showing the housing free of an attached lens, according to an illustrative embodiment.
Figure 2:
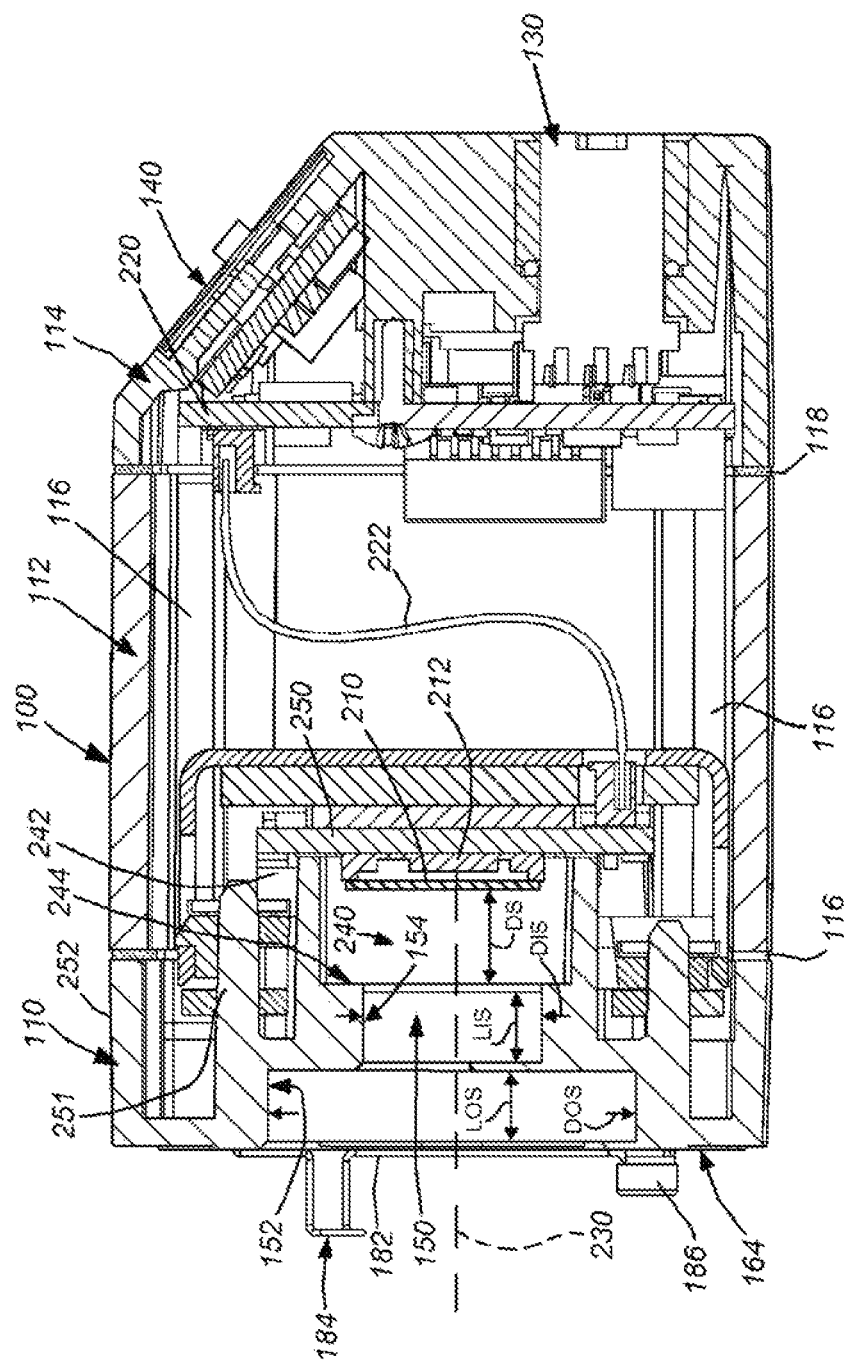
FIG. 2 is a side cross section of the housing taken along Line 2-2 of FIG. 1.

With reference to FIGS. 1 and 2, a vision system that includes an external package or "housing" 100 is shown in detail. The housing 100 can be constructed from polymer, metal, composite or a variety of materials in accordance with ordinary skill. In an embodiment, it consists of a front plate section 110, a main body section 112 and a rear section 114. The front plate section (or "front plate") 110 is joined to the main body and rear sections using four threaded bolts 116 that are seated within wells in the front plate 110, and that engage threaded holes in the rear section, thereby compressing the three sections together against gaskets 118 that seal the housing against infiltration of moisture and other environmental agents. The construction of the housing is highly variable in alternate embodiments. For example, the housing can be constructed with an integrated or unitary rear and main body or a unitary front plate and main body. Likewise, other fastening techniques can be employed, such as employing joining clamps or clips between sections.

In this embodiment, the bolts 116 are located adjacent to each of four corners of the somewhat rectangular-cross-section housing. The bolts 116 each contain respective threaded wells at their front end that allow for the attachment of accessories using threaded fasteners, or the attachment of the housing itself to a mounting surface. Alternatively, the bolts 116 can be substituted with appropriate bolts that also pass through holes in a mounting surface or accessory (not shown), and collectively join the surface/accessory to the sections of the housing in appropriate compression.

The interior of the housing 100 supports an image sensor 212 (FIG. 2) that is arranged to acquire each image frame as an array of individual image pixels. In an embodiment, the sensor array is a CMOS sensor 212 (also termed an "imager"), which acquires image data in the form of pixel data. A cover glass 210 is provided to protect the sensor array 212. The sensor 212 is mounted on a printed circuit board 250 secured as depicted near the front end of the housing. The sensor circuit board 250 also illustratively includes processing circuitry (e.g. a digital signal processor DSP) that receives the pixel data from the sensor array 212 and performs various vision system processes on the data in accordance with non-transitory computer-readable program instructions and/or firmware instructions. The sensor circuit board 250 is interconnected with various power, control and other associated circuit components located on a circuit board 220 in the rear 114 of the housing. The two board assemblies 220, 250 are illustratively interconnected by a multi-lead cable 222 in this embodiment. Other arrangements of circuitry and interconnections are expressly contemplated. For example, in another embodiment, a VSoC arrangement (described above) can be provided to perform image acquisition and processing. The rear section 114 (and/or other sections 110, 112 of the housing) can be constructed from aluminum so as to act as a heat sink that assists in dissipating heat generated within the housing by the circuitry (described further below).

An external connector (or a plurality of connectors) 130 are located at the rear side of the housing 100 for providing power, data and/or other interface functions. The connector(s) is/are operatively connected to the circuit board 220. The rear also includes an external status and control panel 140 that provides the user with status indicators and feedback on vision system operations (for example, indicating whether a symbol has been properly identified and decoded). Appropriate on/off switches and other interface buttons can also be provided at this location, or at another appropriate location on the housing 100.

The plane of the sensor 212 is oriented perpendicularly to the longitudinal axis (i.e. camera axis) 230 of the housing 100. It resides within a space 240 that is open to an aperture 150 within a central region of the front plate 110. The space 240 is bounded by an enclosing wall 242 (having a relatively planar sides that can define a rectangular cross-section tube) that provides clearance for the sensor 212. The wall 242 extends from a step face 244 to the surface of the sensor circuit board 250. The distance DS from the step face 244 to the plane of the sensor 212 is approximately 6 millimeters. The aperture 150 is defined by an outer step 152 and a narrower inner step 154. Each step is threaded as described below. In particular, the outer step 152 defines a diameter DOS of approximately 25.4 millimeters (1 inch), and a depth (along the axial direction) LOS of approximately 5 millimeters. Likewise, the inner step 154 defines a diameter DIS of approximately 12 mm. The outer step 152 is female-threaded to a pitch of 32 threads per inch (TPI) and the inner step 154 is female-threaded to a pitch of 0.5 mm. In general, the positioning of the steps and size of the space are constructed and arranged to accommodate the focal length of each lens type being employed herein.

In an embodiment, the front plate assembly 110 is constructed from metal (e.g. die cast aluminum alloy), which is finished using an appropriate machining process. The casting includes the depicted recesses 152, 154 and other supporting structures (i.e. walls 242, 251 and 252) for lenses and other internal components. Notably, the supporting walls 242 (etc.), which contact and/or surround the sensor circuit board 250 assist in directing heat away from the board 250 and its associated circuit components and into the housing structure, where the heat is dissipated into the surrounding ambient air. In alternate embodiments the layout and configuration of the supporting structures can vary. In general, the thickness of walls used in such supporting structures is selected to provide sufficient structural strength with respect to the material employed in constructing the front plate 110. The front plate assembly 110 includes, along its front face 164, a plurality of threaded holes 160 that can be female-threaded to any appropriate size, so as accept corresponding threaded screws (described below). These screws can be used to attach a plurality of fittings and accessories to the front plate.

Note that directional terms such as "front", "rear", "up", "down", "top" bottom", "right", and "left", as well as their variants and synonyms, should be taken as relative conventions only, and not as absolute indications of orientation of a structure relative to the direction of prevailing gravitational force.

With reference particularly to FIG. 1, the face 164 of the front plate assembly 110 includes a pair of connection sockets 170 and 172 respectively oriented to the right and left of the aperture 150 (as viewed from the front). Both sockets include respective connectors, which are interconnected with the system's processor circuitry (i.e. 250 and 220). The right socket 170 is employed to operate the optics of a liquid lens (described above, and again below). The left socket 172 is employed to interconnect and operate an illumination assembly that can be directly attached to the front plate via threaded holes 160 or can be separately mounted. The illumination assembly is described in further detail in commonly assigned U.S. patent application Ser. No. 13/302,858, entitled CAMERA SYSTEM WITH EXCHANGEABLE ILLUMINATION ASSEMBLY, by Laurens Nunnink, filed on Nov. 22, 2011 and the teachings of which are expressly incorporated herein by reference as useful background information.

The perimeter 180 of the aperture 150 includes a circumferential spring assembly 182 with a pair of diametrically opposed, radially inwardly directed retaining shoulders 184. The spring assembly 182 is removably secured to the front face 164 by opposed screws 186 (M2 thread in this embodiment) that threadingly seat into holes (502 in FIG. 5). In an embodiment, the screws 186 are separated by a distance (on-center) of approximately 28 millimeters, taken through the camera axis (230). As described further below, the removable spring assembly is constructed and arranged to retain a liquid lens assembly.

It is contemplated that a user receives a housing 100 with a cap (not shown) to protect the aperture and sensor, and that the applicable lens is purchased separately—to be attached by the user in a straightforward manner as described further below. Alternatively, the lens can be provided to the housing by the manufacturer. In either case, there are a wide range of lens choices available.

Figure 3:
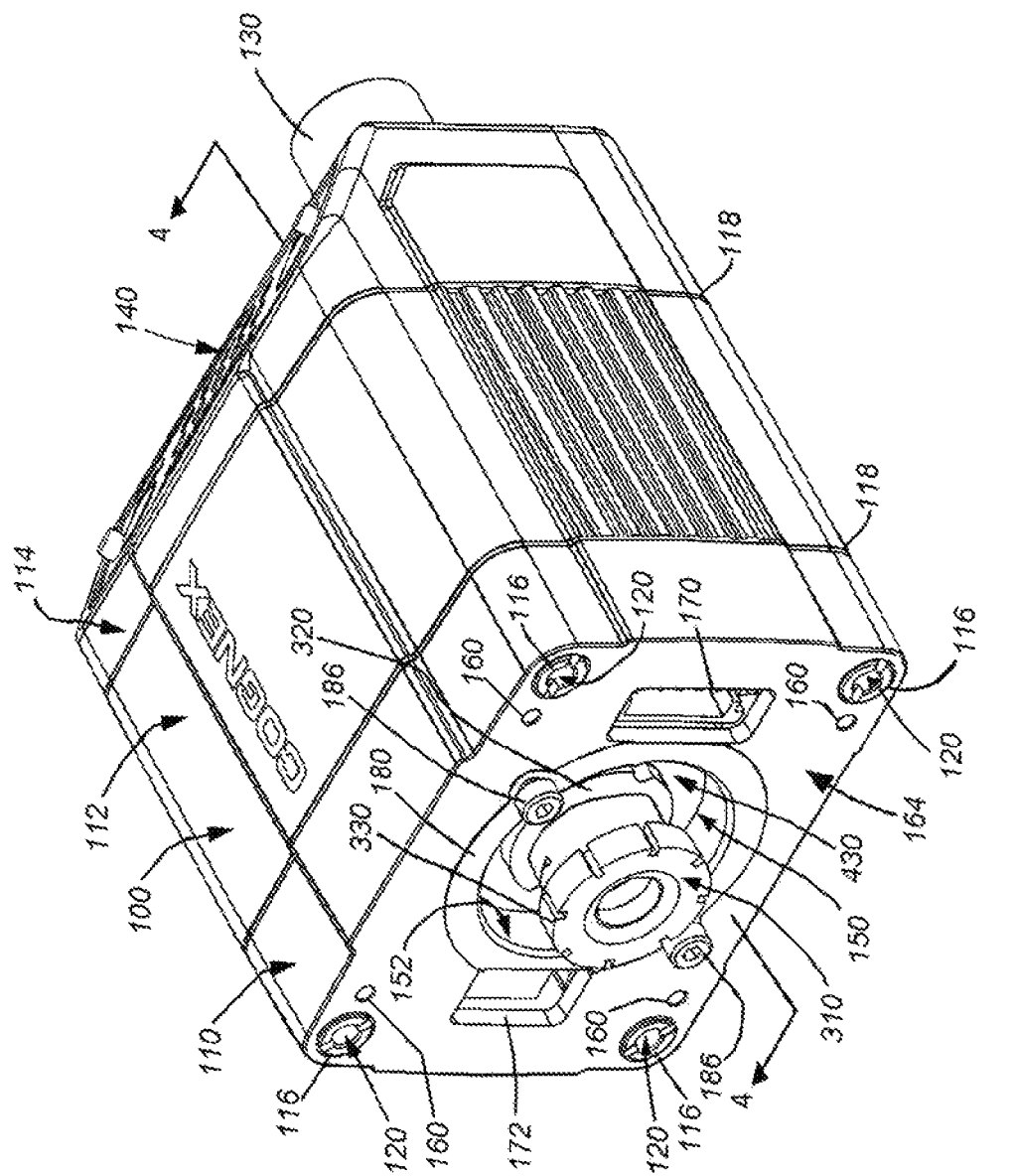
FIG. 3 is a perspective view of the vision system of FIG. 1 in which the housing includes an exemplary M12 or M16 type lens attached thereto, according to an illustrative embodiment.
Figure 4:
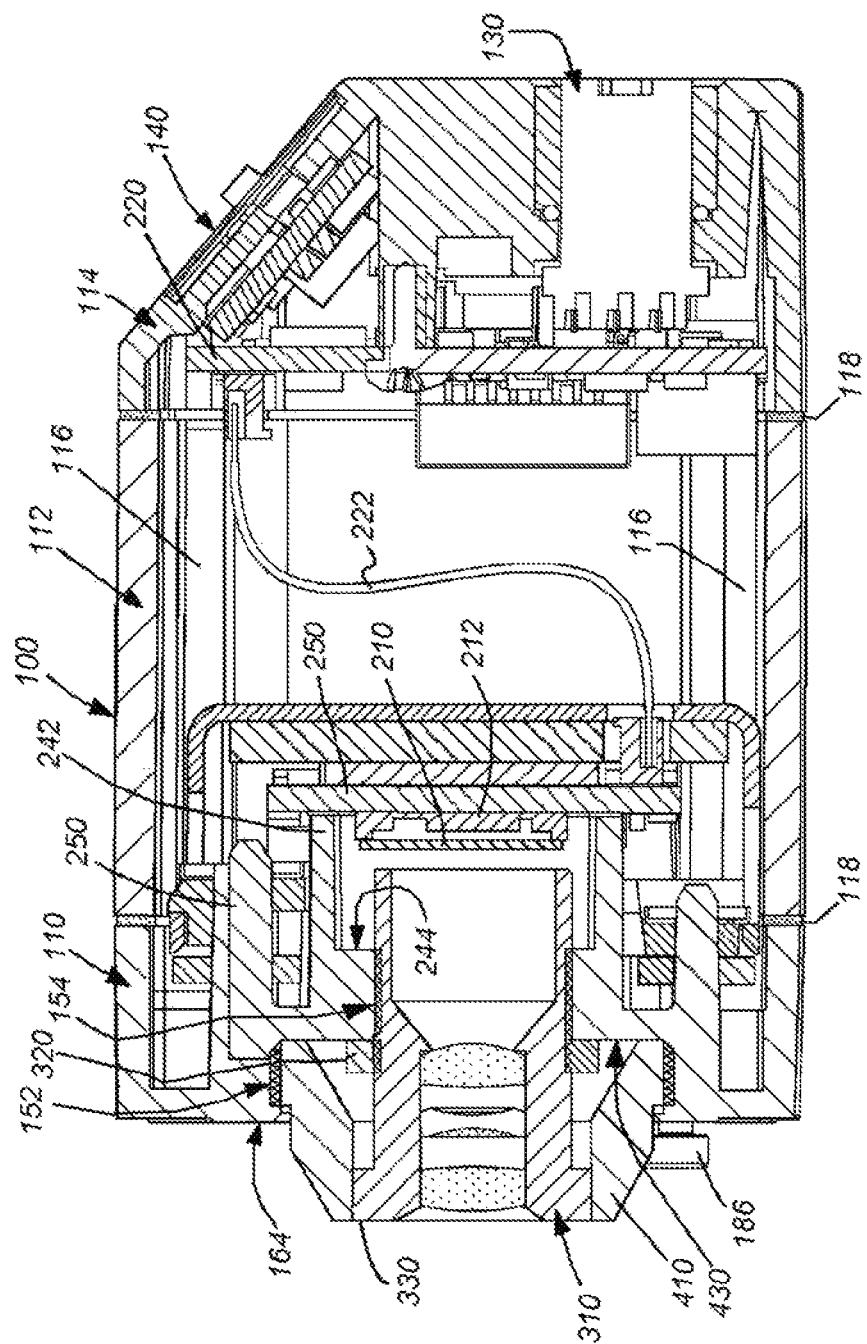
FIG. 4 is a side cross section of the housing taken along Line 4-4 of FIG. 3.

Having described the generalized construction and function of the housing 100 and front plate assembly 110 according to an illustrative embodiment, the implementation of various types of lenses in conjunction with the housing is now described in further detail. With reference to FIGS. 3 and 4, the housing 110 is provided with an attached M12 or M16 lens 310 according to an embodiment. By way of non-limiting example, the lens is a commercially available M12 or M16 lens with a conventional M12 or M16 threaded base. The male thread of the lens is secured into the female thread of the narrower, more-inset step 154, and is stopped from further inward threading, and generally locked in place using a counter nut 320, which is initially threaded onto the lens 310 base before attachment to the front plate assembly 110. The applied counter nut 320 can be adhered by the manufacturer (or another party) in place at an appropriate location along the lens using adhesive or another fixing technique. This ensures that, when the lens is tightened into place (e.g. by the user) to form a tight engagement with the front face 430 of the step 154 as shown, it is also positioned at a proper, predetermined distance with respect to the sensor's image plane. The lens 310 is thereby locked in place at a desired offset (to provide proper focal length) with respect to the plane of the sensor 212. Alternatively, where the user seeks to vary the mounting position of the lens, the counter nut can remain unfixed to the lens thread and counter-rotated by the user (or another party) to secure the lens in a desired position.

The front end of the lens can include a radially outwardly oriented ring 330 that engages the inner perimeter of an optional, frustoconically shaped stopper 410 (FIG. 4). The stopper protects the region of the aperture 150 between the lens front and the outer step 152, and avoids inadvertent loosening or readjustment of the tightened lens/counter ring 310/320 and protects against infiltration of dirt and moisture.

The stopper 410 can be any acceptable shape, or alternatively omitted. It is secured to the front plate assembly 110 by a pressed-in friction fit that resides against the female threads in the outer step 152. It is illustratively mounted by pressing it into the thread well until it seats against the front face 430 of the inner step 154 as shown (FIG. 4). The stopper can be constructed from an elastomeric material. In alternate embodiments, the stopper can employ a different securing system with respect to the housing front plate assembly 110, such as clips or mating threads.

Figure 5:
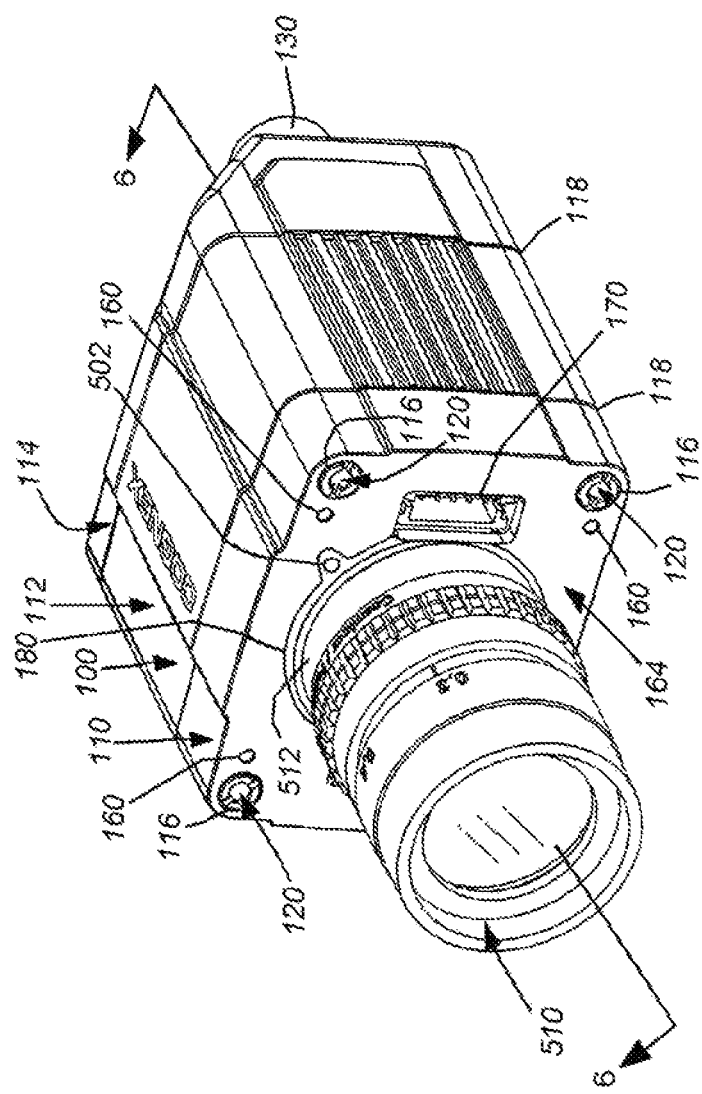
FIG. 5 is a perspective view of the vision system of FIG. 1 in which the housing includes an exemplary C-Mount type lens attached thereto, according to an illustrative embodiment.

It should be clear that attachment and detachment of the exemplary M12 or M16 lens 310 is relatively straightforward, and entails the threaded rotation of only a few components with respect to the inner step 154 and (optionally) the outer step 152. Thus, the user or the manufacturer can desirably assemble an M12 or M16 lens vision system from a few readily available components. Likewise, if the user desires a C-mount-lens-based vision system, the housing can be assembled as shown in FIGS. 5-7.

Figure 6:
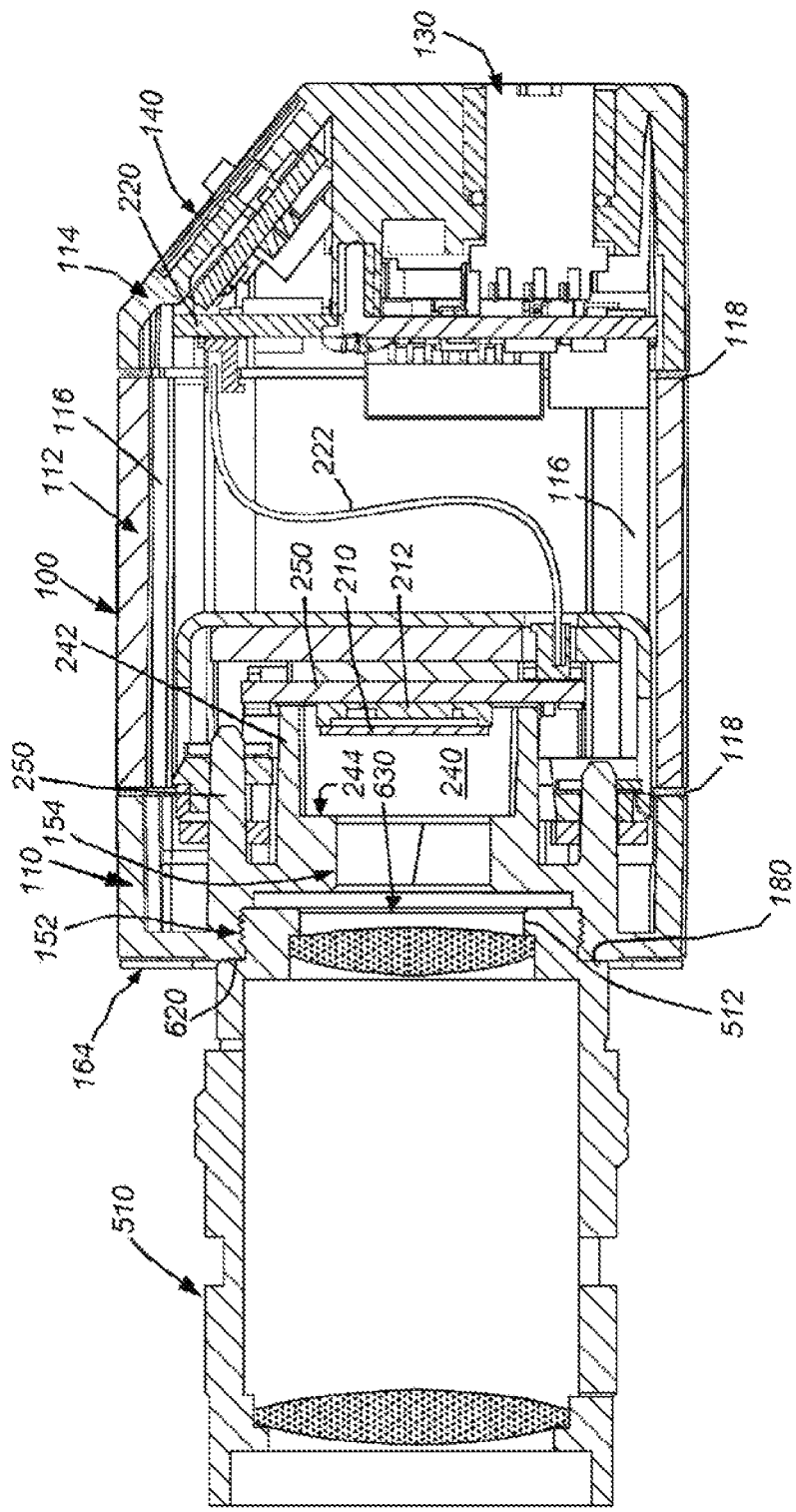
FIG. 6 is a side cross section of the housing taken along Line 6-6 of FIG. 5.
Figure 7:
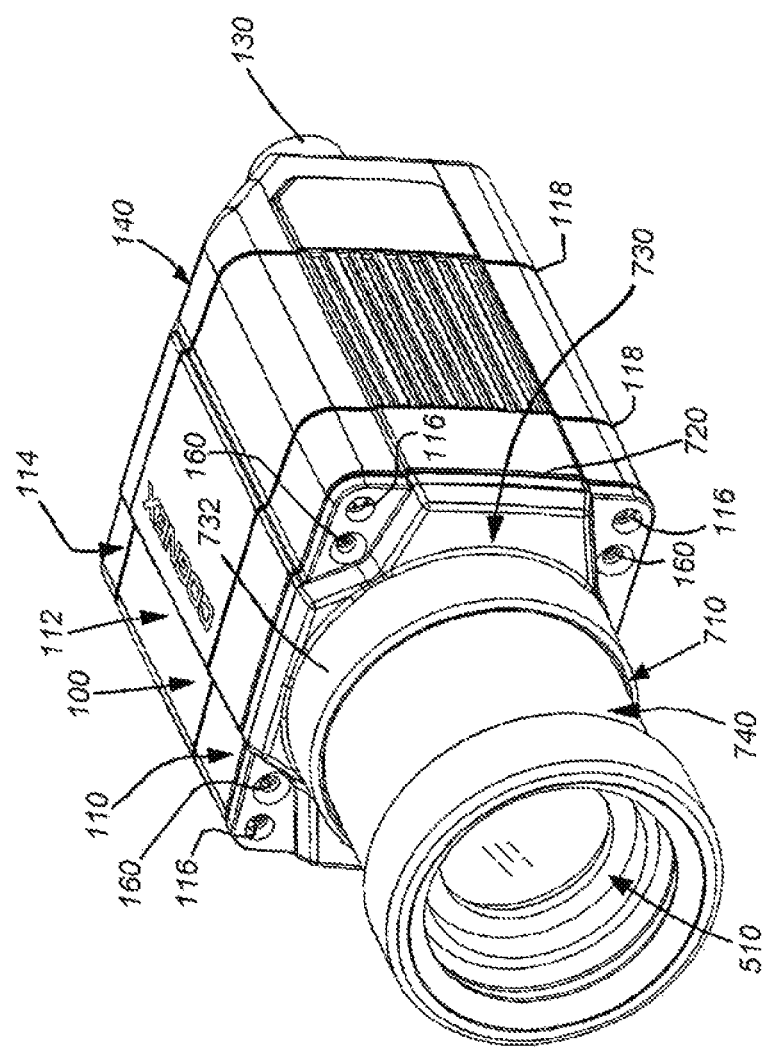
FIG. 7 is a perspective view of the vision system shown in FIG. 6 in which the housing includes the exemplary C-Mount type lens attached thereto, in which the lens is covered by an optional shroud assembly, according to an illustrative embodiment.

As shown, the male-threaded base 512 of the exemplary C-mount lens 510 is threadingly attached to the female threads of the outer step 152 as shown (FIG. 6). The base 512 is tightened until its rear shoulder 620 engages the perimeter 180 of the aperture 150. The perimeter 180 is spaced from the plane of the sensor at an appropriate distance so as to provide the proper focal length for the lens 510 with respect to the sensor's image plane. The perimeter 180 upon which the lens shoulder 620 can be slightly recessed (as shown) relative to the surrounding front face 164 to provide the correct clearance, or it can be raised relative thereto to provide the proper focal length. In alternate embodiments, the step 152 and its front perimeter face can be a lockable insert that is adjustable within the surrounding front plate assembly (using an outer coaxial thread that mates between the insert and the front plate, for example) to allow the seating location of the lens to vary, thereby varying the focal length. Notably, the optics of the lens 510, combined with the geometry of the front plate assembly 110 focuses received light rays so that they pass free of interference from the rear end 630 of the lens 510 through the smaller diameter step 154, and into the space 240. In this manner, the light rays received by the lens 510 are focused to cover the area of the sensor 212.

The C-Mount lens can be optionally covered by a shroud (or cover) assembly 710 (FIG. 7) that primarily protects it from ingress of dirt/contaminants and moisture. The shroud 710 can also serve to protect against inadvertent change to the lens settings. The shroud assembly consists of a gasket plate 720 that covers the front face (164) and an overlying shroud base 730. The gasket plate 720 and shroud base include through-holes that expose the central threaded holes (120) of each of the assembly bolts 116. This allows the system to be mounted as described above or receive additional accessories on top of the shroud base 730. The gasket plate 720 and shroud base 730 thereby cover and seal the sockets (170, 172) in this configuration. In alternate embodiments, one or both of the sockets 170, 172 can be exposed through the gasket plate 720 and shroud base 730. The shroud base 730 and gasket plate 720 are secured to the front plate assembly 110 are compressibly secured by four screws (not shown) that thread into the screw holes 160 formed on the front plate assembly 110. In this embodiment, the shroud base 730 is countersunk in the region of each threaded hole 160 to receive a correspondingly shaped machine screw. Different screws or any other fastener arrangement that secures the shroud base 730 and (optionally) the gasket plate 720 can be employed in alternate embodiments can be employed in alternate embodiments. The front ring 732 of the shroud base 730 receives the shroud body 740, which overlies and covers the lens 510. The shroud body 740 can be constructed as a single piece, or from a plurality of pieces (e.g. a main body and nose as shown). It can be secured to the ring 732 by a threaded interconnection or another fastening arrangement.

Figure 8:
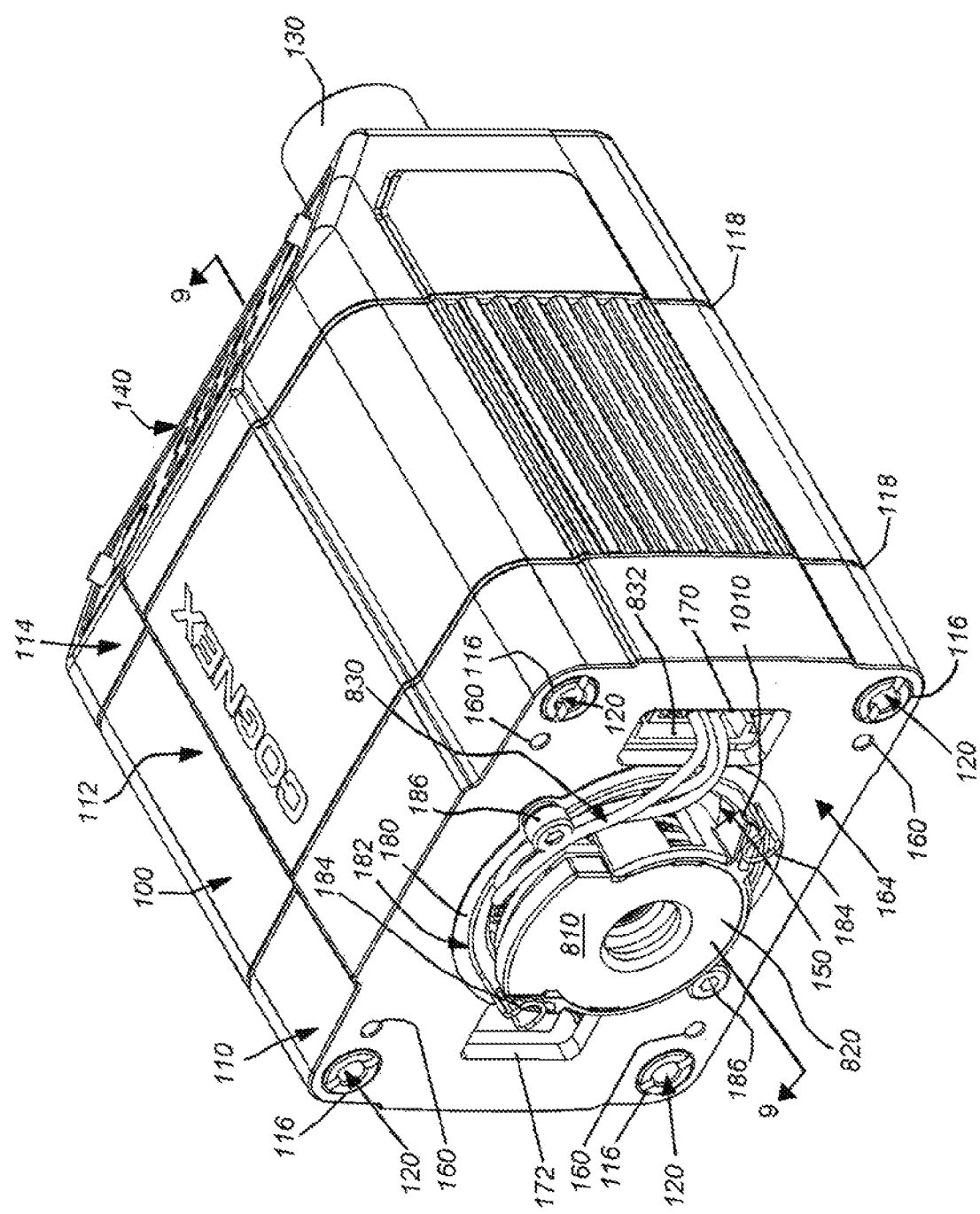
FIG. 8 is a perspective view of the vision system of FIG. 1 in which the housing includes an exemplary liquid type lens attached thereto, according to an illustrative embodiment.
Figure 9:
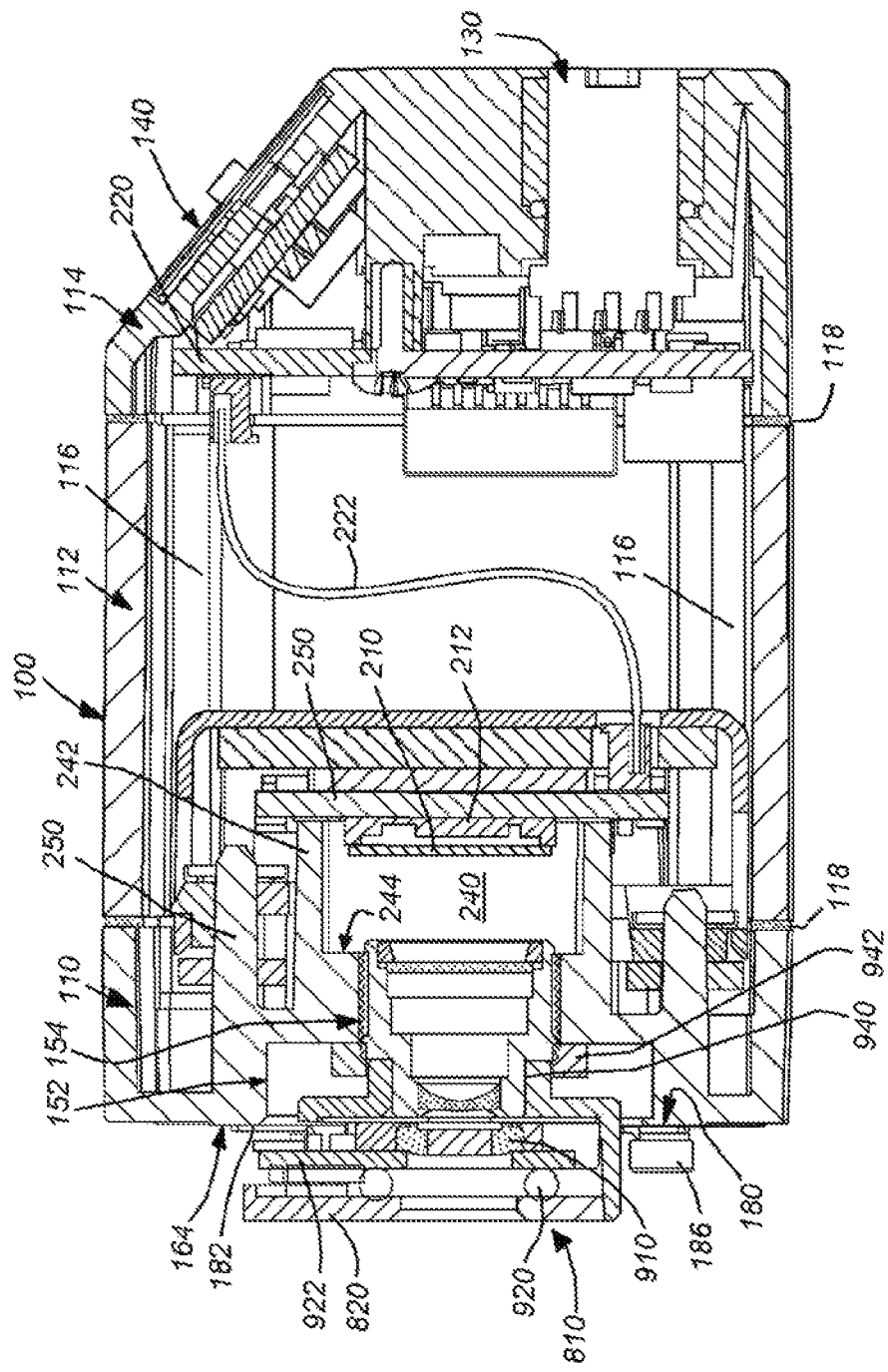
FIG. 9 is a side cross section of the housing taken along Line 9-9 of FIG. 8.
Figure 10:
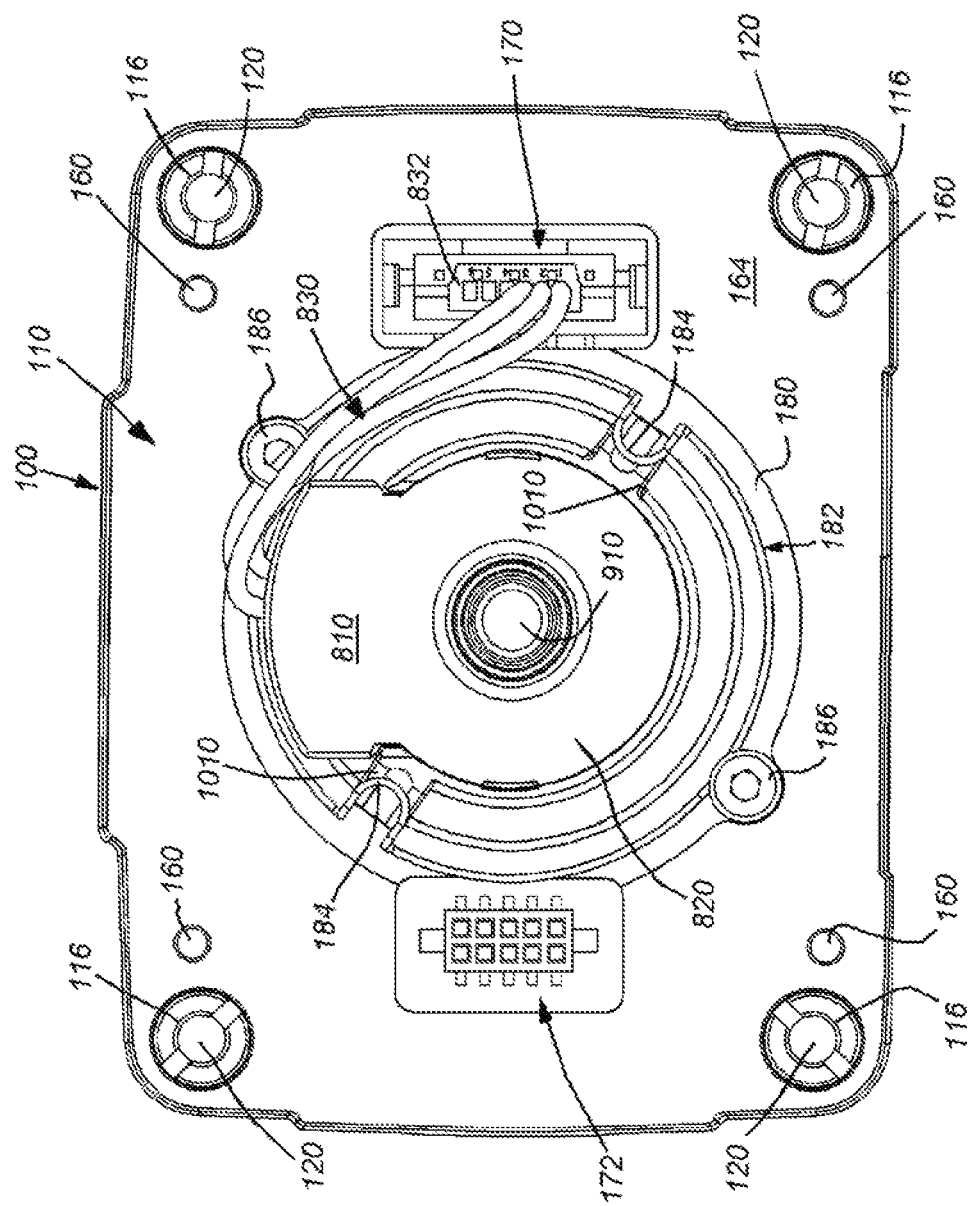
FIG. 10 is a front view of the vision system shown in FIG. 8 in which the housing includes the exemplary liquid type lens attached thereto, according to an illustrative embodiment.

Notably, with reference to FIGS. 8-10, the versatility of the housing 100 and front plate assembly 110 enables mounting of an electronically operated, auto-focusing liquid lens 810 according to an illustrative embodiment. As described also above, a liquid lens uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. As noted above, relative to other autofocus mechanisms, the liquid lens has extremely fast response times. It is also ideal for applications with reading distances that change from object-to-object (surface-to-surface) or during the changeover from the reading of one object to another object.

In this embodiment, the exemplary liquid lens 810 can be based upon a commercially available liquid lens component 910 (FIG. 9) available from Varioptic SA of France. The liquid lens component 910 is mounted within an outer shell/housing 820 that is secured in place by the spring shoulders 184 described above. It is expressly contemplated that alternate hold-down arrangements for the liquid lens can be employed. For example, the housing can include a C-mount base that engages the threads of the outer step 152. An advantage of the spring-retained lens arrangement is that it allows for the positioning of the connector cable 830 in a location that leads properly to the socket 170 (where the cable's connector 832 is shown connected in FIG. 8). Note that the socket and connector can be any acceptable multi-pin arrangement that provides sufficient connections to control the lens.

The inner face of the lens' outer shell or housing 820 engages an O-ring (or other resilient structure that allows an open central aperture) 920 that, in turn, pressurably bears upon the circuit board 922. This circuit board 922 includes the control circuitry employed according to the art to operate the focal length adjustment of the lens component 910. The lens is compressed between the circuit board and the internal, fixed lens assembly 940 that focuses light rays from the liquid lens component onto the sensor 212. The fixed lens assembly 940 is secured into the front plate assembly 110 by threads that engage the inner step 154. A counter ring 942 prevents loosening of this lens assembly 940. The pressure applied by the spring retaining shoulders 184 is sufficient to retain the lens component 910 free of movement and vibration, but this pressure also remains within the desired specification to avoid over-compression of the lens component 910, which could degrade performance or burst the lens.

With reference briefly to the front view of FIG. 10, the spring retaining shoulders are arranged to engage associated abutments 1010 on each of opposing sides of the lens outer housing/shell 820. Like the spring assembly hold-down screws 186, the abutments 1010 are located at a non-vertical and non-horizontal angle with respect to the geometry (top, bottom, right and left sides) of the system housing 100. This allows for the cable 830 to exit the top end of the lens housing/shell 820 free of interference by the hold-down components. In this embodiment, the spring shoulders 184 (and abutments 1010) are aligned along a line that is approximately perpendicular to the line between the screws 186. In alternate embodiments a larger or smaller number of screws and/or spring shoulders 184 (among other fastening arrangements) can be used to retain the lens 810 with respect to the front face 164 of the housing 100. Likewise, it is contemplated that the overall spring assembly can be constructed as a single unit with an appropriate number of retaining shoulders to secure the lens, or a multi-part unit each having one or more shoulders (as shown).

It is expressly contemplated that the arrangement of components in both (or either of) the internal fixed lens assembly 942 and the overlying liquid lens module (810) are highly variable in alternate embodiments. The depicted illustrative embodiment is an effective arrangement that can be assembled in a straightforward manner by the manufacturer or user.

II. Self-Contained Interchangeable Lens Module

Figure 11:
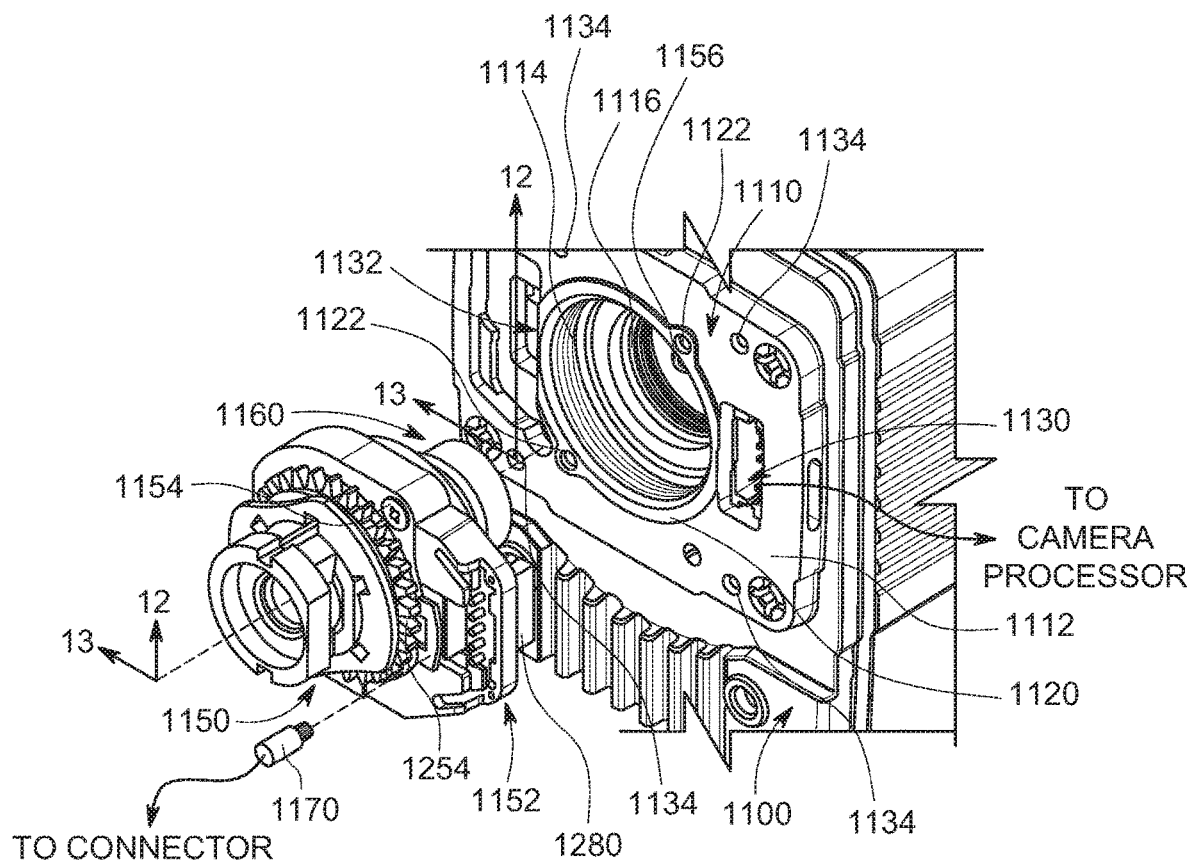
FIG. 11 is an exploded perspective view of a vision system camera housing as described generally herein and a self-contained lens assembly for interchangeable mounting thereto according to an embodiment.

Reference is made to FIG. 11, which shows a vision system camera assembly housing 1100 that can be structurally and functionally similar to the housing 100 described above, particularly with respect to the lens mounting face 1110, which can include similar features, threads and measurements to the face 164 described above. Alternatively, the housing 1100 can define various structural and functional differences. As shown, the mounting face defines a flat front surface 1112 that includes a C-mount thread 1114, and more-internal M16 thread 1116, as described above. The face 164 includes a precisely machined (or otherwise formed) base ring 1120 for receiving a conventional C-mount base. The ring (also termed a C-mount "flange") 1120 includes a pair of threaded (e.g. M2) holes 1122 that are on opposite sides of the ring 1120, in locations similar to threaded holes 186, described above. The threaded holes 1122 are oriented on a diagonal line with respect to the horizontal and vertical axes of the housing to provide clearance for a five-pin DIN (or other pin-count/format) connector and associated well 1130 that removably interconnects with lens electronics as described above and further below. The screw holes 1122 also provide clearance for an opposing illumination connection socket 1132, described above with reference to well 172. The face 1110 also includes threaded fitting holes 1134 similar or identical in placement and function to holes 160 described above.

An interchangeable lens module 1150 is shown adjacent to the housing 1100 and associated mounting face 1110. The lens module 1150 is described in detail below. The lens module includes a lens bracket or frame 1152 that is adapted to confront the mounting face 1110 in a precise relationship. The lens frame 1152 is secured to the housing face 1110 using a pair of M2 screws 1154, which are sized and arranged to engage respective screw holes 1122 in the face 1110. When secured, the lens barrel 1160 is positioned at an axial position and alignment (relative to the image plane of the housing's image sensor 1156), which is substantially the same as, and/or identical to, that which is mandated by the C-mount specification—and is normally obtained by the precise threads of the mount assembly. However, the lens module 1150 is free of any mounting threads on the lens barrel, thus simplifying attachment and removal of the module. By way of non-limiting example, the image sensor 1156 can be of 3-5 Mpixel in size and employ (e.g.) 3.45 micron pixels.

Figure 12:
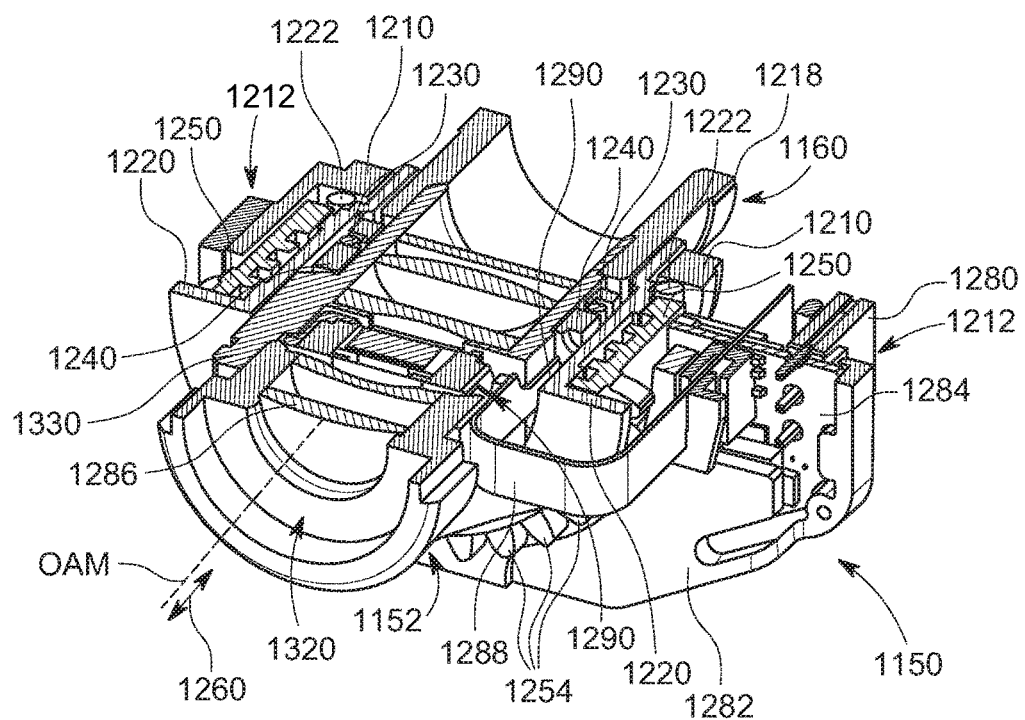
FIG. 12 is a top cross-section of the interchangeable lens assembly taken along line 12-12 of FIG. 11.
Figure 13:
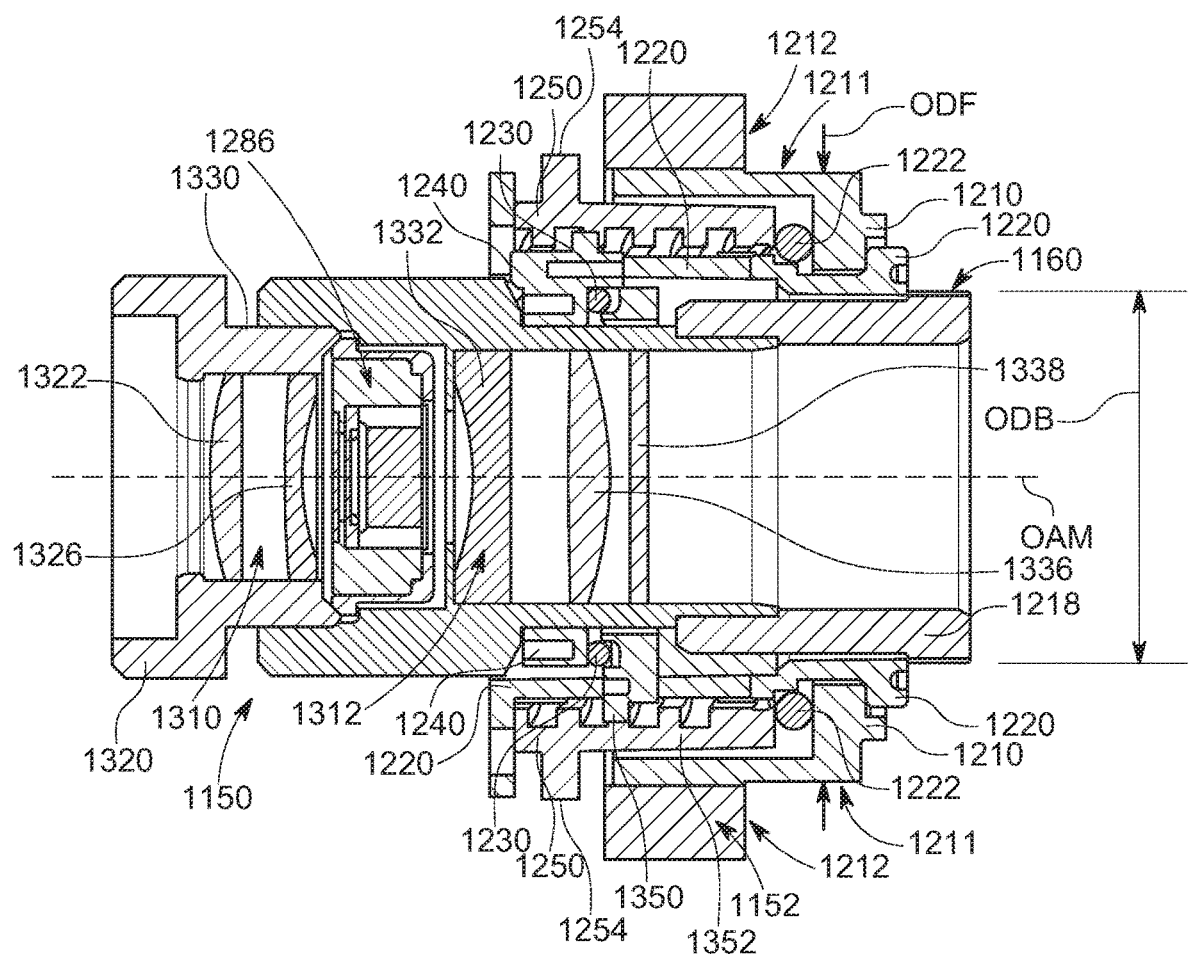
FIG. 13 is a side cross section of the interchangeable lens assembly taken along line 13-13 of FIG. 11.

With further reference to the cross-section views of FIGS. 12 and 13, the frame 1152 can be constructed from a durable and rigid material, such as high-strength polymer or, typically, metal. For example, brass or aluminum alloy. The frame 1152 defines a precision machined (or otherwise formed) rear face 1212 that is adapted to seat accurately against the ring 1120 of the housing face 1110. The interengagement of the rear face 1212 and the ring 1120 provide the desired axial spacing and alignment between the module's lens optics. In various exemplary implementations, the rear end 1218 of the lens barrel 1160 is sized and arranged so that its outer diameter ODB is no larger than the minimum inner diameter (internal thread peaks) of the M16 (or other) threaded mount 1116, which is adjacent to the image sensor 1156. As such, the lens barrel and associated optics can be positioned as close as required to the sensor 1156 and free to move axially relative to the housing, as described below. Similarly the annular surface 1211 of the intermediate frame piece 1210 defines an outer diameter ODF that is no larger than the minimum inner diameter (internal thread peaks) of the C-mount thread mount 1114.

Figure 14:
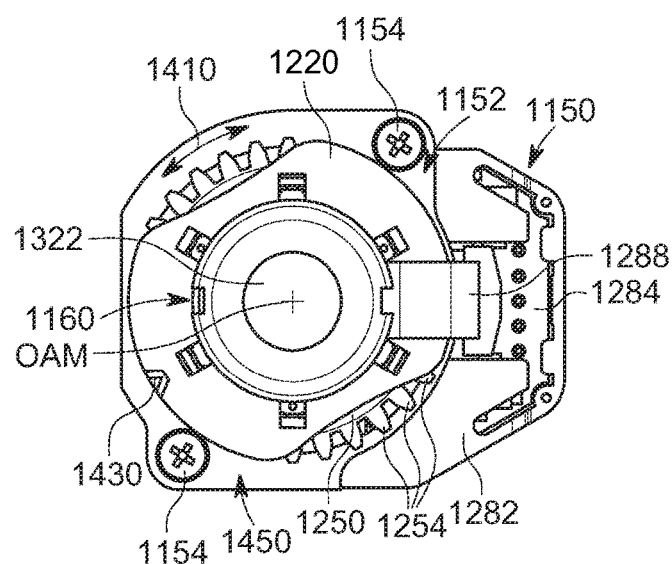
FIG. 14 is a front view of the interchangeable lens assembly of FIG. 11.
Figure 15:
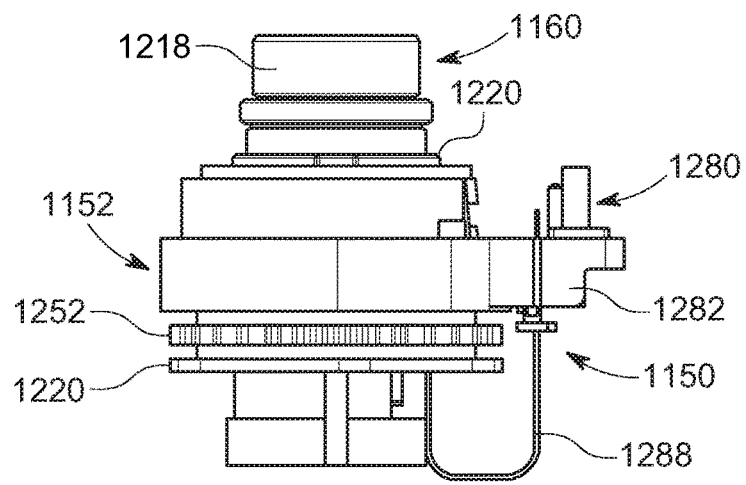
FIG. 15 is a top view of the interchangeable lens assembly of FIG. 11.

The lens barrel 1160 is supported within the frame 1152 by intermediate frame pieces 1210 and 1220. An O-ring 1230 is provided on the lens module 1150. This O-ring is located within an adjustment base assembly 1240 that engages a square (internal) thread of an adjustment ring assembly 1250. This ring assembly can be constructed from a durable polymer or metal, such as aluminum alloy. The adjustment base assembly 1240 is secured to the outer surface of the lens barrel 1160 and, when the adjustment ring assembly 1250 is rotated (double-curved-arrow 1410 in FIG. 14), it moves the lens barrel axially (double-arrow 1260 in FIG. 12) along optical axis OAM. This axial movement occurs without (free-of) rotation of the lens barrel 1160. Rotation of the lens barrel can be restrained by providing an anti-rotation groove and pin arrangement between the fixed (non-rotating) side of the module frame assembly and the carrying frame pieces attached to the lens barrel. Such an anti-rotation assembly can be provided with the frame pieces in an area behind the threads (1352, described below) of the adjustment ring assembly 1250. The adjustment ring assembly 1250 thereby allows for coarse focal distance adjustment. Such adjustment can be input manually by the user at setup, or through a geared motor 1170 (FIG. 11) that can engage the geared teeth 1254 of the ring assembly 1250. Such a motor 1170 can attached to the module 1150 by appropriate brackets, fasteners, etc., and its power/control can be integrated with the module's electronics. The motor can provide feedback or regulated operation—for example using an encoder or stepper arrangement. Note that the intermediate frame piece 1220 provides a partial front cover, and retaining plate, for the adjustment ring 1250 and gear 1254 as shown in FIG. 14.

Briefly, another O-ring 1222 is shown. This O-ring is used during assembly of the module. Intermediate frame piece 1220 is mounted onto frame piece 1210 with a bayonet-style mount in this example. During this assembly, the rear of the adjustment ring assembly 1250 compresses the O-ring 1222, along with frame piece, and frame piece 1220 is rotated into frame piece 1210 until it snaps into a locked position. The counter-pressure of the O-ring 1222 retrains frame pieces 1220 and 1210 in this locked position. Hence the O-ring provides a snap function in the bayonet mount between frame pieces 1210 and 1220.

The module includes a fixed connector 1280, facing rearwardly and arranged to mate with the connector in the well 1130 on the mounting face 1110 of the vision system camera housing 1100. Thus, when attaching the module 1150 to the camera housing 1100, the user aligns the connector 1280 with the well 1130 and presses the module axially onto the mounting face 1110. This causes the frame 1152 to align so that screws 1154 can be secured to threaded holes 1122. When secured, the pins of the module connector 1280 electrically contact corresponding pins in the well connector 1130. The connector 1280 is mounted on an (e.g.) overmolded polymer part that comprise a support member 1282, which is mated to the metal (e.g. brass) frame 1152 More particularly, and with reference to FIG. 14, in the exemplary implementation, the metal (brass) frame defines a generally (sideways) U-shaped bracket 1450. In other words, the metal bracket 1450 surrounds the left, top and bottom sides of the lens barrel 1160 and associated adjustment ring assembly 1250. It provides a rigid and accurate plate for at least two screws 1154 to engage the housing's C-mount ring/flange 1120. The right side of the bracket's U-shape can define a thin wall, or opening, that is filled by a semi-hollow plastic part 1282, which is overmolded on the bracket, and thereby encloses the driver electronics of the lens module 1150. The overmolding process can be accomplished by any acceptable technique and can use a variety of plastics, including acrylic, polycarbonate, nylon, resin composites, PET, ABS, etc. The metal bracket 1450 can include channels and other structures (not shown) along the open side to anchor the overmolded part 1282. The overmolded part 1282 can extend onto and/or cover all or a portion of the metal bracket 1450 as appropriate. Alternatively, the plastic part can be adhered or mechanically attached to the metal bracket after its formation. Appropriate adhesives, fasteners or interengaging snaps on the part can be employed with corresponding anchoring surfaces/structures on the bracket.

The support member 1282 defines an extension of the frame 1152 that overlies the housing connector well 1130 and is formed with a receiving cavity as depicted in FIG. 12 to enclose and secure a circuit board 1284. This circuit board (also termed a PCB) provides the driver electronics for a variable lens assembly—in this example comprising a liquid lens 1286, such as the model EL-3-10, commercially available from Optotune AG of Switzerland. Other types and models of variable lenses, both electromechanical and liquid-based can be employed in various exemplary lens modules herein—for example those available from Varioptic of France. In an exemplary implementation, the driver electronics (PCB 1284, etc.) contains an (e.g.) I2C protocol interface with the camera housing's processor, digital-to-analog current converter to drive the lens adjustment based upon digital signals received from the camera processor, and a memory (for example, an EEPROM to store lens data, such as calibration data, hardware ID, lens type, focal length, etc.). The cavity that secures the PCB 1284 in the member 1282 can have appropriate fasteners, shoulders, snaps, etc. to ensure the driver PCB 1284 remains in place in the cavity. The cavity within the member 1282 can be fully or partially covered or sealed after assembly to prevent incursion of moisture and contaminants.

The circuit board 1284 and variable (liquid) lens assembly 1286 are interconnected by a flexible printed circuit board PCB (or an appropriate (e.g. ribbon) cable and connector) 1288. The flexible PCB 1288 extends from the front of the circuit board 1284 and curves rearwardly along the side of the lens barrel 1160 to interconnect with the liquid lens assembly 1286. The flexible PCB 1288 can also include a temperature sensor (of conventional or custom design) 1290 that contacts the side of the barrel 1160, and measures the present temperature of the lens unit. This sensed temperature reading is transmitted to the circuit board 1284, and then to the camera housing processor (via the connectors 1280 and 1130), to provide a feedback loop that compensates for temperature drift in the optical power of the liquid lens assembly 1286 by readjusting the focal distance of the liquid lens. Such feedback-based adjustment is shown and described in U.S. patent application Ser. No. 13/800,055, entitled LENS ASSEMBLY WITH INTEGRATED FEEDBACK LOOP FOR FOCUS ADJUSTMENT, filed Mar. 13, 2013, the teachings of which are incorporated by reference as useful background information. Because the PCB 1288 is flexible, it can elastically deform to accommodate axial movement (double-arrow 1260) of the lens barrel 1160 in response to rotation (double-curved-arrow 1410) of the adjustment ring assembly 1152. In embodiments where adjustment is provided by a motor or other electromechanical system (e.g. linear motor), the circuit board 1284 can include electrical connections for power and location feedback. The PCB 1288 is connected to the liquid lens through a slot 1290 in the side of the main body 1330.

Note that, in an operational implementation, the adjustment ring assembly 1152 allows the user or manufacturer to pre-focus the lens optics of the lens module to a similar distance at zero optical power of the liquid lens 1286. In manual implementations, exposing a part of the geared surface allows the user or other to more readily carry out an adjustment after mounting the lens module on the housing. In general, adjustment can be carried out without (free of) removing the camera's front cover. Notably, the internal design of the adjustment ring assembly 1250 is such that rotational/angular movement of the gear surface 1254 is converted into an axial movement of the lens barrel 1160 in a manner that is substantially free of backlash. More particularly, the adjustment ring assembly 1250 includes squared (e.g. Acme) internal threads 1352 that closely engage corresponding threads 1550 on the adjustment base assembly 1240. This interengagement is particularly accurate and precise. As a further option, the geared surface 1254 can engage a spring-loaded pawl 1430 that is integrated with the adjustment ring. This enables adjustment positions to be locked. The use of an indexing gear also allows for repeatability by counting clicks. It is also contemplated that further feedback arrangements, and associated electrical connections to between the lens module and the housing (e.g. lens position feedback), can be provided in accordance with the above-incorporated U.S. patent application Ser. No. 13/800, 055.

With reference particularly to FIG. 13, the lens barrel 1160 of the exemplary embodiment is a 24 millimeter focal length design (F/6). The liquid lens assembly 1286 is located between a front lens stack 1310 and rear lens stack 1312 of lenses. The arrangement, number and parameters of lenses can differ widely depending upon the desired performance, focal distance, etc. of the lens. Various combinations of convex lenses, planoconvex lenses, biconcave lenses, biconvex lenses, etc. can be employed. The depicted example includes a front capsule 1320, housing the front lens stack 1310, which is removably threaded to the main lens body 1430 in a manner that allows access to the liquid lens assembly 1286. By way of example, the front lens stack 1310 consists of (e.g.) two or more lenses in this example 1322 and 1326. The rear lens stack 1312, behind the liquid lens assembly 1286, in the main body 1330, also consists of two or more lenses 1332 and 1336, as well as a plate cover 1338.

It is contemplated that the variable (e.g. liquid) lens component (when fitted) can be in any acceptable location within the lens stack. Hence, the liquid lens can be positioned at or near the front of the unit, center (as described) or rear, depending upon the performance characteristics of the unit—for example placement may vary for a high-depth-of-field lens unit.

Figure 16:
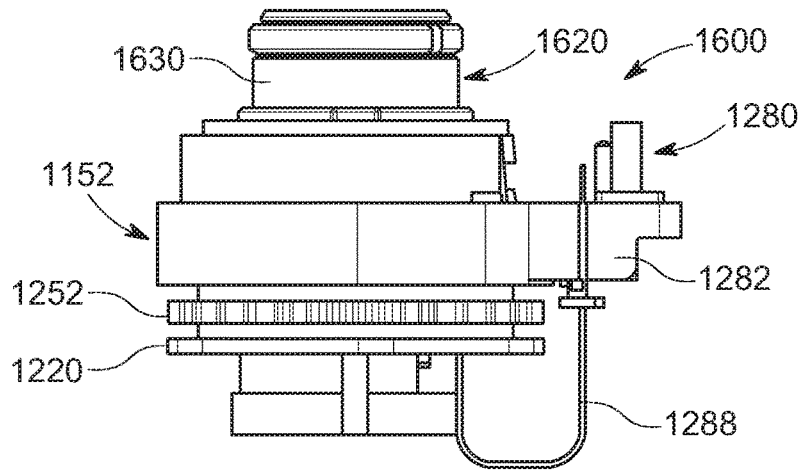
FIG. 16 is a top view of an interchangeable lens assembly for use in the arrangement of FIG. 11 defining an alternate set of lens parameters.

FIG. 16 shows another embodiment of a lens module 1600 in which the lens barrel 1620 defines a focal length f of 16 millimeters (F/8). Similar or identical components to those of FIGS. 11-15 are similarly numbered. The rear portion 1630 of the lens barrel 1620 is shorter that the rear 1160 described above. It is sized and arranged to seat within the C-Mount and M16 thread mounts.

Figure 17:
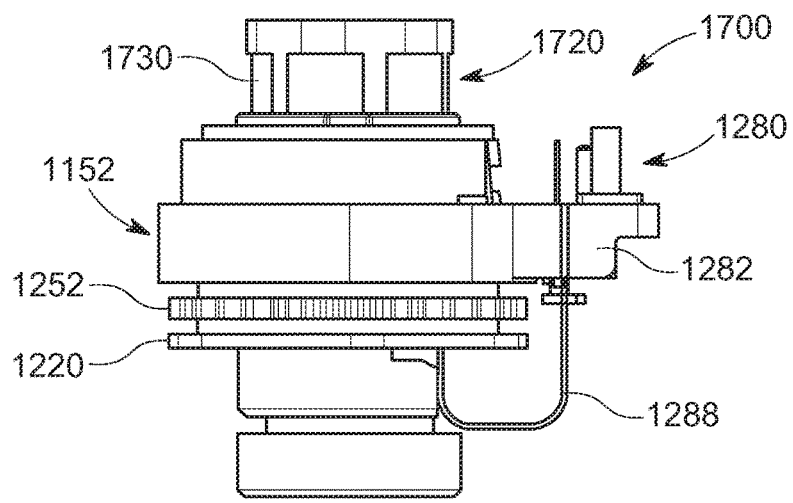
FIG. 17 is a top view of an interchangeable lens assembly for use in the arrangement of FIG. 11 defining another alternate set of lens parameters.

FIG. 17 shows yet another embodiment of a lens module 1700 in which the lens barrel 1720 defines a focal length f of 24 millimeters (F/10). Again, similar or identical components to those of FIGS. 11-15 are similarly numbered. The rear portion 1730 of the lens barrel is shown, and shorter than that of the lens barrel 1160 described above. It is configured to fit within the C-Mount and M16 threads.

It is expressly contemplated that lenses with differing focal distances (f) and/or F values can be implemented within the module architecture described above. By way of non-limiting example a 35 millimeter lens can be provided in an embodiment. The specified depth-of-field for such lenses is also highly variable in a manner clear to those of skill in optical design.

III. Conclusion

It should be clear that the vision system housing and associated front plate construction provides a highly versatile system for selecting and "directly attaching" a variety of desirable lenses and lens mount types that are traditionally not interchangeable on a single housing without (free of) additional adapters. Such adapters can reduce accuracy, increase the chance of loosening of components and generally increase the system's complexity. The resulting vision system allows for fewer specialized components and more customization either by the manufacturer or end user. More particularly, the system provides the end user with the ability to change out lens types so that the system can be updates or re-tasked to a new use from an earlier use, as desired. The use of an interchangeable lens modules with respect to (e.g.) the C-mount base allows for a wide variety of lens types to be employed readily with the vision system. These lens types can employ high-speed liquid lenses that meet the requirement of more-advanced, current image sensors, such as those employing 3.45 micron pixels. The lens modules allow for ready adjustment of focus using an externally accessed gear surface with ratcheting/locking capability. The modules also enable ready interconnection with the housing electronics connector in a single motion as the lens is seated onto the housing mounting face. Making use of the C-mount ring/flange ensured a defined distance between this flange and the sensor, but use of the actual C-mount to mount the lens is avoided. Instead, two (or more) small, threaded holes are used that are located in, or close to, the C-mount flange. This enables straightforward installation of the entire lens module (unlike earlier versions requiring separate insertion and connection of a liquid lens and then a cap lens), including electrical connections, in a single step.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, while the illustrative housing is adapted for use with M16 and C-mount lens bases, it is expressly contemplated that adapters can be employed to allow for attachment of other lens types, such as the T-mount lens—for example the above-described alternate embodiment having an outer step insert. Likewise, the front plate assembly can be constructed and arranged to provide a different combination of mounts by appropriately sizing and threading the stepped apertures. Moreover, while various components are attached using threaded screws, it is expressly contemplated that other fastener types can be used for various interconnections, such as snap-connectors, rivets, clips, and the like. Also, in an embodiment, a plurality of front plate assemblies can be produced and provided to a standard main body section and rear to allow for further versatility of the vision system. In addition, any process or processor herein can comprise one or more electronic hardware components, software in the form a non-transitory computer-readable medium of program instructions, or a combination of hardware and software. More generally, the term "process" should be taken broadly to include various combinations of hardware components and/or software program steps that perform one or more functions in a system or method. Accordingly, this description is meant to be taken only by way of example, and not to otherwise limit the scope of this invention.

What is claimed is:

1. A vision system comprising:
 a housing with a front mounting face with an aperture aligned relative to an image sensor located within an interior of the housing, the aperture having an outer step having a first diameter;
 the outer step being constructed and arranged to receive a first lens type base, wherein the outer step defines female threads for mounting the first lens type and a mounting flange on the mounting face for the first lens type base, the mounting flange defining oppositely oriented threaded holes; and
 a lens module having a frame assembly and a lens barrel, the frame assembly being arranged to engage the flange, the frame assembly further having fasteners aligned with fastener receiving members on the front face located at, or adjacent to, the flange, whereby the lens barrel is mounted relative to the sensor in an aligned and spaced-apart relationship, free of mating threads between the lens barrel and the housing.

2. The vision system as set forth in claim 1 further comprising an inner step having a second diameter smaller than the first diameter, being constructed and arranged to receive a second lens type, and wherein the inner step defines female threads for mounting the second lens type base.

3. The vision system as set forth in claim 2 wherein a rear portion of the lens barrel is constructed and arranged to reside adjacent to the inner step.

4. The vision system as set forth in claim 2 wherein the outer step is constructed and arranged to receive a C-mount lens base and the inner step is constructed and arranged to receive an M16 lens base.

5. The vision system as set forth in claim 1 wherein the fasteners comprise at least two screws passing through receiving holes in the frame assembly and the fastener receiving members comprise threaded holes, respectively constructed and arranged to receive the screws.

6. The vision system as set forth in claim 1 wherein the lens barrel has a variable lens assembly and the frame assembly has a fixed connector constructed and arranged to mate with a connector on the mounting face top provide an electrical connection between the housing and the variable lens assembly.

7. The vision system as set forth in claim 6 wherein the fixed connector projects from the frame assembly and the connector on the mounting face resides in a well that is sized and arranged to allow insertion of the fixed connector when the module is mounted on the flange with a portion of the lens barrel located in the housing.

8. The vision system as set forth in claim 7 wherein the variable lens assembly is a liquid lens assembly located adjacent at least one of a front, a center and rear of an arrangement of a plurality of fixed lenses.

9. The vision system as set forth in claim 8 wherein the frame assembly has a driver circuit board electrically connected to the fixed connector, and further comprising, an electrical connection located between the circuit board and the liquid lens assembly.

10. The vision system as set forth in claim 9 wherein the connection interconnects a temperature sensor located at or adjacent to the lens barrel.

11. The vision system as set forth in claim 10 wherein the electrical connection comprises a flexible PCB.

12. The vision system as set forth in claim 6 wherein the lens module is one of a plurality of lens modules each adapted for attachment to the flange with the fastening members, each of the plurality of lens modules having a respective lens barrel with discrete optical parameters.

13. The vision system as set forth in claim 12, further comprising an adjustment ring assembly located between the frame assembly and the lens barrel, constructed and arranged to vary an axial position of the lens barrel with respect to the housing by rotation thereof.

14. The vision system as set forth in claim 13 wherein the adjustment ring assembly defines a gear surface located on an exterior of the lens module.

15. The vision system as set forth in claim 14 wherein the gear surface is adapted to be at least one of (a) engaged by a user's fingers and (b) driven by a geared motor.

16. The vision system as set forth in claim 1 wherein the lens barrel defines a focal distance between approximately 10 millimeters and 35 millimeters.

17. The vision system as set forth in claim 1 wherein the frame assembly defines a U-shaped bracket for carrying the lens barrel, the flange defines a lens C-mount and the fasteners define at least two screws, and wherein the bracket defines an open side at which is attached a polymer part overmolded onto the bracket that encloses driver electronics relative to control of function of the lens module.

18. A lens module for removable attachment to a vision system housing comprising:
   lens driver electronics that is mounted with respect to the module;
   a lens barrel having a liquid lens;
   an adjustment ring assembly, having an adjustment base assembly secured to an outer surface of the lens barrel, that axially moves the lens barrel, in a manner substantially free of rotation of the lens barrel relative to the module, based upon rotation of an adjustment ring mechanism relative to the module; and
   a flexible connection between the liquid lens and the lens driver electronics.

19. The lens module as set forth in claim 18 wherein the flexible connection comprises a cable or a flexible PCB.

20. The lens module as set forth in claim 18 wherein the lens driver electronics is located adjacent to a frame assembly of the module in an attached enclosure, the frame assembly engaging a mounting face of a vision system housing having an image sensor.

21. The lens module as set forth in claim 20 wherein a connector fixedly attached to the lens driver electronics removably engages a connector on the mounting face.

22. A vision system comprising:
   a housing with a front mounting face with an aperture aligned relative to an image sensor located within an interior of the housing, the aperture having an outer step having a first diameter and an inner step having a second diameter smaller than the first diameter;
   the outer step being constructed and arranged to receive a first lens type base, wherein the outer step defines female threads for mounting the first lens type and a mounting flange on the mounting face for the first lens type base, wherein the outer step is constructed and arranged to receive a C-mount lens base;
   the inner step being constructed and arranged to receive a second lens type, wherein the inner step defines female threads for mounting the second lens type base, wherein the inner step is constructed and arranged to receive an M16 lens base; and
   a lens module having a frame assembly and a lens barrel, the frame assembly being arranged to engage the flange, the frame assembly further having fasteners aligned with fastener receiving members on the front face located at, or adjacent to, the flange, whereby the lens barrel is mounted relative to the sensor in an aligned and spaced-apart relationship, free of mating threads between the lens barrel and the housing.

\* \* \* \* \*